US012675221B2

(12) United States Patent
Wang

(10) Patent No.: US 12,675,221 B2
(45) Date of Patent: Jul. 7, 2026

(54) TEMPERATURE DEPENDENT OPERATION OF MEMORIES

(71) Applicant: YANGTZE MEMORY TECHNOLOGIES CO., LTD., Wuhan (CN)

(72) Inventor: Shuangping Wang, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 226 days.

(21) Appl. No.: 18/409,357

(22) Filed: Jan. 10, 2024

(65) Prior Publication Data

US 2025/0103212 A1 Mar. 27, 2025

(30) Foreign Application Priority Data

Sep. 27, 2023 (CN) .......................... 202311273187.8

(51) Int. Cl.
*G06F 3/06* (2006.01)
(52) U.S. Cl.
CPC .......... *G06F 3/0616* (2013.01); *G06F 3/0653* (2013.01); *G06F 3/0659* (2013.01); *G06F 3/0679* (2013.01)
(58) Field of Classification Search
None
See application file for complete search history.

(56) References Cited

U.S. PATENT DOCUMENTS

| | | | | |
|---|---|---|---|---|
| 10,725,509 | B2 * | 7/2020 | Wang .................. | G06F 11/0757 |
| 11,017,823 | B1 * | 5/2021 | Kamepalli .............. | G06F 1/206 |

| | | | | |
|---|---|---|---|---|
| 2006/0039108 | A1 * | 2/2006 | Chikusa .................... | G06F 1/20 |
| 2006/0161375 | A1 * | 7/2006 | Duberstein ........... | G06F 1/3296 |
| | | | | 702/132 |
| 2007/0140030 | A1 * | 6/2007 | Wyatt ...................... | G11C 5/00 |
| | | | | 365/212 |
| 2009/0018708 | A1 * | 1/2009 | O'Neil ............... | G05D 23/1919 |
| | | | | 700/300 |
| 2016/0037686 | A1 * | 2/2016 | Shabbir .................. | G06F 1/206 |
| | | | | 700/300 |

(Continued)

FOREIGN PATENT DOCUMENTS

| | | |
|---|---|---|
| CN | 108304156 A | 7/2018 |
| CN | 109407793 A | 3/2019 |

(Continued)

OTHER PUBLICATIONS

Merriam-Webster, "in accordance with", Aug. 19, 2022, pp. 1-9, https://web.archive.org/web/20220819054026/https://www.merriam-webster.com/dictionary/in%20accordance%20with (Year: 2022).*

(Continued)

*Primary Examiner* — Christopher D Birkhimer
(74) *Attorney, Agent, or Firm* — Conley Rose, P.C.

(57) ABSTRACT

Examples of the present disclosure provide memory systems and operating methods thereof, and computer-readable storage mediums. An example memory system includes a memory device and a memory controller. The memory controller is configured to obtain a temperature parameter at a first time instance and a temperature parameter at a second time instance, a rate of data transmission at the first time instance, and a thermal throttling parameter at the first time instance and determine an upper limit of the rate of data transmission at a third time instance. The second time instance is at least one time instance before the first time instance, and the third time instance is a time instance after the first time instance.

20 Claims, 13 Drawing Sheets

100

(56)                    References Cited

U.S. PATENT DOCUMENTS

| | | | | |
|---|---|---|---|---|
| 2016/0378149 A1* | 12/2016 | Kam | | G06F 1/3225 |
| | | | | 713/320 |
| 2017/0269653 A1* | 9/2017 | Shabbir | | H05K 7/20727 |
| 2017/0269654 A1* | 9/2017 | Shabbir | | G06F 13/4018 |
| 2017/0318707 A1* | 11/2017 | Shabbir | | H05K 7/20836 |
| 2018/0232021 A1* | 8/2018 | Perchlik | | G06F 1/206 |
| 2020/0081507 A1* | 3/2020 | Nowell | | G01K 3/005 |
| 2020/0213468 A1* | 7/2020 | Ito | | H04N 1/00034 |
| 2021/0318822 A1* | 10/2021 | Sloat | | G06F 1/206 |
| 2022/0012150 A1* | 1/2022 | Panse | | G06F 11/3058 |
| 2022/0147126 A1 | 5/2022 | Chin et al. | | |
| 2023/0066696 A1* | 3/2023 | Taira | | G11C 7/04 |

FOREIGN PATENT DOCUMENTS

| | | | | | | |
|---|---|---|---|---|---|---|
| CN | 110096233 A | * | 8/2019 | | | G06F 11/3058 |
| CN | 112463529 A | | 3/2021 | | | |
| CN | 114706529 A | | 7/2022 | | | |
| CN | 116524968 A | | 8/2023 | | | |
| DE | 102008054598 A1 | * | 8/2010 | | | G06F 1/206 |
| ES | 2748596 T3 | * | 3/2020 | | | G06F 1/206 |
| WO | 0011675 | | 3/2000 | | | |

OTHER PUBLICATIONS

Pure Storage, "What is 3D Nand and How Does it Work?", May 20, 2022, pp. 1-6, https://web.archive.org/web/20220520230611/https://www.purestorage.com/knowledge/what-is-3d-nand.html (Year: 2022).*

Yangtze Memory Technologies Co., Ltd., "First Examination Opinion Notice Aug. 8, 2025," CN App. No. 202311273187.8, 8 p. (plus 8 p. translation).

Yangtze Memory Technologies Co., Ltd., "Second Review Comments Notification," mailed Apr. 4, 2026, CN App No. 202311273187.8, 8 p. (plus 8 page translation).

* cited by examiner

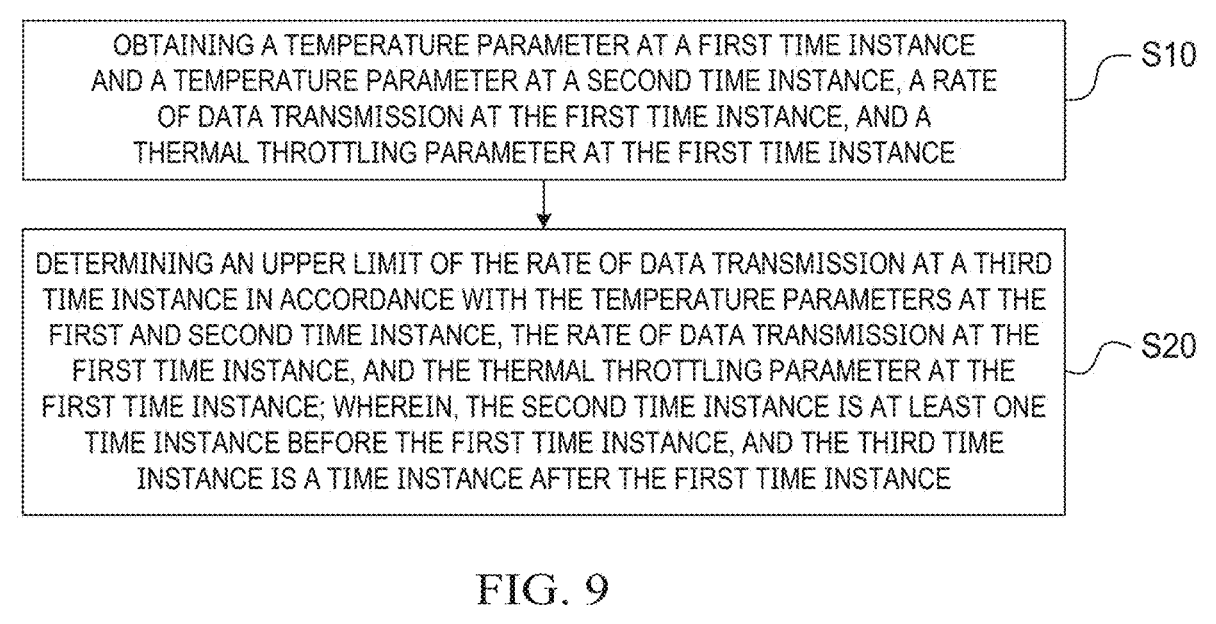

OBTAINING A TEMPERATURE PARAMETER AT A FIRST TIME INSTANCE AND A TEMPERATURE PARAMETER AT A SECOND TIME INSTANCE, A RATE OF DATA TRANSMISSION AT THE FIRST TIME INSTANCE, AND A THERMAL THROTTLING PARAMETER AT THE FIRST TIME INSTANCE — S10

DETERMINING AN UPPER LIMIT OF THE RATE OF DATA TRANSMISSION AT A THIRD TIME INSTANCE IN ACCORDANCE WITH THE TEMPERATURE PARAMETERS AT THE FIRST AND SECOND TIME INSTANCE, THE RATE OF DATA TRANSMISSION AT THE FIRST TIME INSTANCE, AND THE THERMAL THROTTLING PARAMETER AT THE FIRST TIME INSTANCE; WHEREIN, THE SECOND TIME INSTANCE IS AT LEAST ONE TIME INSTANCE BEFORE THE FIRST TIME INSTANCE, AND THE THIRD TIME INSTANCE IS A TIME INSTANCE AFTER THE FIRST TIME INSTANCE — S20

FIG. 9

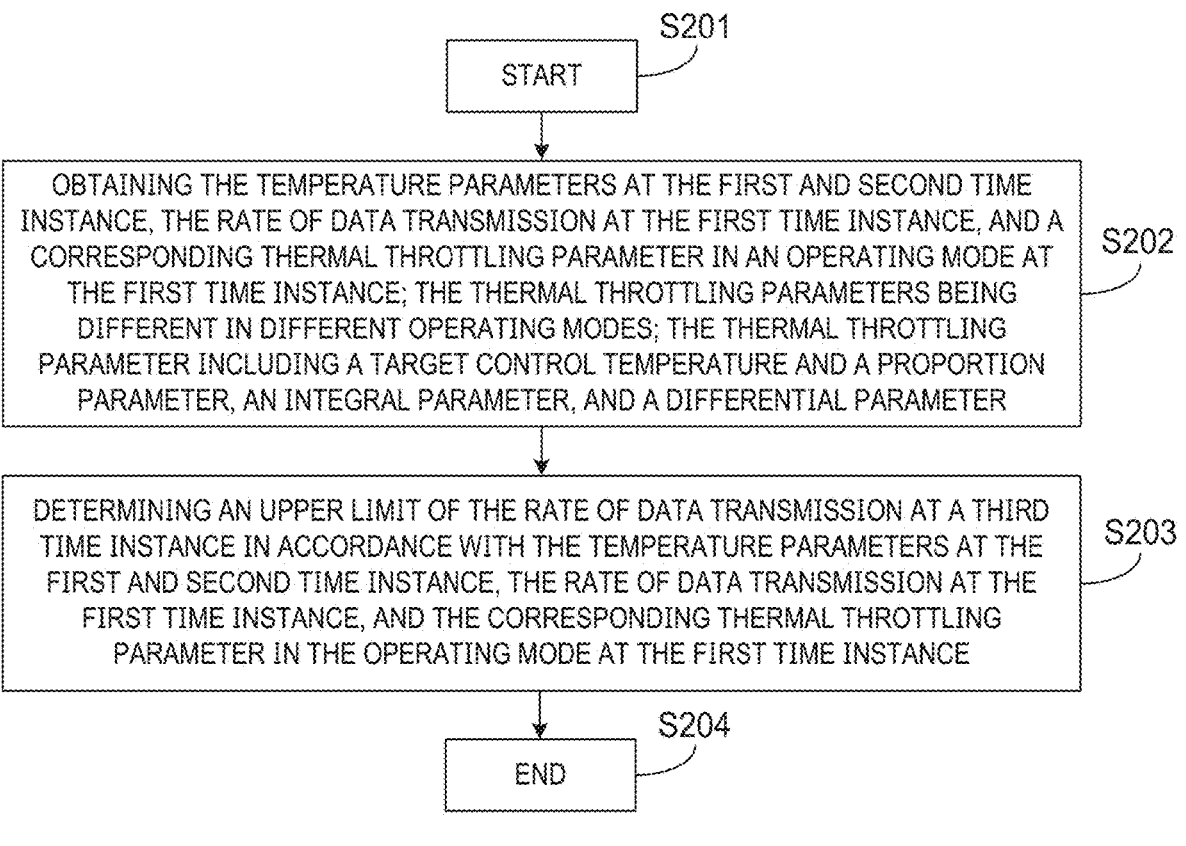

S201

START

OBTAINING THE TEMPERATURE PARAMETERS AT THE FIRST AND SECOND TIME INSTANCE, THE RATE OF DATA TRANSMISSION AT THE FIRST TIME INSTANCE, AND A CORRESPONDING THERMAL THROTTLING PARAMETER IN AN OPERATING MODE AT THE FIRST TIME INSTANCE; THE THERMAL THROTTLING PARAMETERS BEING DIFFERENT IN DIFFERENT OPERATING MODES; THE THERMAL THROTTLING PARAMETER INCLUDING A TARGET CONTROL TEMPERATURE AND A PROPORTION PARAMETER, AN INTEGRAL PARAMETER, AND A DIFFERENTIAL PARAMETER

S202

DETERMINING AN UPPER LIMIT OF THE RATE OF DATA TRANSMISSION AT A THIRD TIME INSTANCE IN ACCORDANCE WITH THE TEMPERATURE PARAMETERS AT THE FIRST AND SECOND TIME INSTANCE, THE RATE OF DATA TRANSMISSION AT THE FIRST TIME INSTANCE, AND THE CORRESPONDING THERMAL THROTTLING PARAMETER IN THE OPERATING MODE AT THE FIRST TIME INSTANCE

S203

END

COMPUTER READABLE STORAGE MEDIUM

COMPUTER PROGRAM

1310

TEMPERATURE DEPENDENT OPERATION OF MEMORIES

CROSS-REFERENCE TO RELATED APPLICATIONS

The present application claims priority to Chinese Patent Application No. 2023112731878, which was filed Sep. 27, 2023, is titled "MEMORY SYSTEM AND ITS OPERATING METHOD, COMPUTER-READABLE STORAGE MEDIUM," and is hereby incorporated herein by reference in its entirety.

FIELD OF TECHNOLOGY

Examples of the present application relate to the field of semiconductor technology, and in examples to a memory system and operating method thereof, and a computer-readable storage medium.

BACKGROUND

At present, memory systems are usually provided as internal semiconductor integrated circuits in computers or other electronic devices, and are widely used in various fields, including embedded systems, such as computers and network interconnection equipment, and also include voice, image, and data storage products, such as digital cameras, digital recorders, etc.

SUMMARY

Examples of the present disclosure provide a memory system and operating method thereof, and a computer-readable storage medium.

According to a first aspect of an example of the present application, a memory system is provided, including: a memory device; a memory controller coupled to the memory device and configured to: obtain a temperature parameter at a first time instance and a temperature parameter at a second time instance, a rate of data transmission at the first time instance, and a thermal throttling parameter at the first time instance; in accordance with the temperature parameters at the first and second time instance, the rate of data transmission at the first time instance, and the thermal throttling parameter at the first time instance, determine an upper limit of the rate of data transmission at a third time instance; wherein, the second time instance is at least one time instance before the first time instance, and the third time instance is a time instance after the first time instance.

In the scheme described above, the memory controller is configured to: obtain the temperature parameters at the first and second time instance, the rate of data transmission at the first time instance, and a corresponding thermal throttling parameter in an operating mode at the first time instance; the thermal throttling parameters being different in different operating modes; the thermal throttling parameter including a target control temperature and a proportion parameter, an integral parameter, and a differential parameter; in accordance with the temperature parameters at the first and second time instance, the rate of data transmission at the first time instance, and the corresponding thermal throttling parameter in the operating mode at the first time instance, determine an upper limit of the rate of data transmission at a third time instance; wherein any two adjacent ones of the time instances are separated by a preset period.

In the scheme described above, the memory controller is configured to: when the temperature parameter at the first time instance exceeds the target control temperature, the rate of data transmission at the third time instance is controlled to be below the corresponding upper limit of the rate of data transmission, so that the temperature parameter is close to the target control temperature.

In the scheme described above, the memory controller is configured to: determine the upper limit of the rate of data transmission at the third time instance in accordance with the following calculation formula: $V3\_limt=V2-\{P*(T2-T1)+I*[(T2+T1)/2-Tsp]+D*[(T0+T2)/2-T1]\}$; wherein, $V3\_limt$ is the upper limit of the rate of data transmission at the third time instance, $V2$ is the rate of data transmission at the first time instance, $T0$ is the temperature parameter at the second time instance separated from the first time instance by two preset periods, $T1$ is the temperature parameter at the second time instance separated from the first time instance by one preset period, $T2$ is the temperature parameter at the first time instance, $Tsp$ is the target control temperature, $P$ is the proportion parameter, $I$ is the integral parameter, and $D$ is the differential parameter.

In the scheme described above, the memory controller is further configured to: obtain a threshold of temperature difference; when the temperature parameter at the first time instance is greater than or equal to the sum of the target control temperature and the threshold of temperature difference, set the upper limit of the rate of data transmission at the third time instance to be less than or equal to the preset rate of data transmission.

In the scheme described above, the preset rate of data transmission is a rate of data transmission corresponding to 10% of full power consumption of a memory system.

In the scheme described above, the memory controller is configured to: determine the operating mode in which the memory system is at the first time instance; and obtain the corresponding thermal throttling parameter in the operating mode at the first time instance in accordance with the determined operating mode.

In the scheme described above, the memory controller is further configured to: obtain the proportion parameter, integral parameter, and differential parameter which are optimal in the corresponding operating mode respectively for each of various operating modes of the memory system; generate a mapping table between the various operating modes and the corresponding optimal proportion parameters, integral parameters, and differential parameters, store the mapping table and trigger a call in the corresponding operating mode.

In the scheme described above, the memory controller is configured to: obtain multiple temperature measurement data from temperature sensors at different locations included in the memory system, and obtain the temperature parameters with the multiple temperature measurement data, and by a temperature composite algorithm.

According to a second aspect of an example of the present application, a method for operating a memory system is provided, the method includes: obtaining a temperature parameter at a first time instance and a temperature parameter at a second time instance, a rate of data transmission at the first time instance, and a thermal throttling parameter at the first time instance; in accordance with the temperature parameters at the first and second time instance, the rate of data transmission at the first time instance, and the thermal throttling parameter at the first time instance, determining an upper limit of the rate of data transmission at a third time instance; wherein, the second time instance is at least one time instance before the first time instance, and the third time instance is a time instance after the first time instance.

In the scheme described above, the method further includes: obtaining the temperature parameters at the first and second time instance, the rate of data transmission at the first time instance, and a corresponding thermal throttling parameter in an operating mode at the first time instance; the thermal throttling parameters being different in different operating modes; the thermal throttling parameter including a target control temperature and a proportion parameter, an integral parameter, and a differential parameter; in accordance with the temperature parameters at the first and second time instance, the rate of data transmission at the first time instance, and the corresponding thermal throttling parameter in the operating mode at the first time instance, determining an upper limit of the rate of data transmission at a third time instance; wherein any two adjacent ones of the time instances are separated by a preset period.

In the scheme described above, the method further includes: determining the upper limit of the rate of data transmission at the third time instance in accordance with the following calculation formula: $V3\_limt=V2-\{P*(T2-T1)+I*[(T2+T1)/2-Tsp]+D*[(T0+T2)/2-T1]\}$; wherein, $V3\_limt$ is the upper limit of the rate of data transmission at the third time instance, $V2$ is the rate of data transmission at the first time instance, $T0$ is the temperature parameter at the second time instance separated from the first time instance by two preset periods, $T1$ is the temperature parameter at the second time instance separated from the first time instance by one preset period, $T2$ is the temperature parameter at the first time instance, $Tsp$ is the target control temperature, $P$ is the proportion parameter, $I$ is the integral parameter, and $D$ is the differential parameter.

In the scheme described above, the method further includes: obtaining a threshold of temperature difference; when the temperature parameter at the first time instance is greater than or equal to the sum of the target control temperature and the threshold of temperature difference, setting the upper limit of the rate of data transmission at the third time instance to be less than or equal to the preset rate of data transmission.

In the scheme described above, the method further includes: determining the operating mode in which the memory system is at the first time instance; obtaining the corresponding thermal throttling parameter in the operating mode at the first time instance in accordance with the determined operating mode.

In the scheme described above, the method further includes: obtaining the proportion parameter, integral parameter, and differential parameter which are optimal in the corresponding operating mode respectively for each of various operating modes of the memory system; generating a mapping table between the various operating modes and the corresponding optimal proportion parameters, integral parameters, and differential parameters, storing the mapping table and triggering a call in the corresponding operating mode.

According to a third aspect of the example of the present application, a memory system is provided, including: a memory device; a memory controller coupled to the memory device and configured to: within a period after the temperature parameter of the memory system exceeds the target control temperature, in different operating environments, by adjusting the rate of data transmission of the memory system, cause the fluctuation of the rate of data transmission of the memory system to gradually become smaller until the fluctuation is stable, and the temperature parameter to be close to the target control temperature when the temperature parameter is stable.

According to a fourth aspect of an example of the present application, a computer readable storage medium is provided, the computer readable storage medium has a computer program stored thereon that when executed by a processor, may implement operations of the method for operating a memory system described in the second aspect.

BRIEF DESCRIPTION OF THE DRAWINGS

FIG. 9 is a schematic flowchart of an implementation of a method for operating a memory system provided by an example of the present application;

FIG. 11 is a flowchart of a method for operating a memory system provided by an example of the present application;

DETAILED DESCRIPTION

Figure 1:
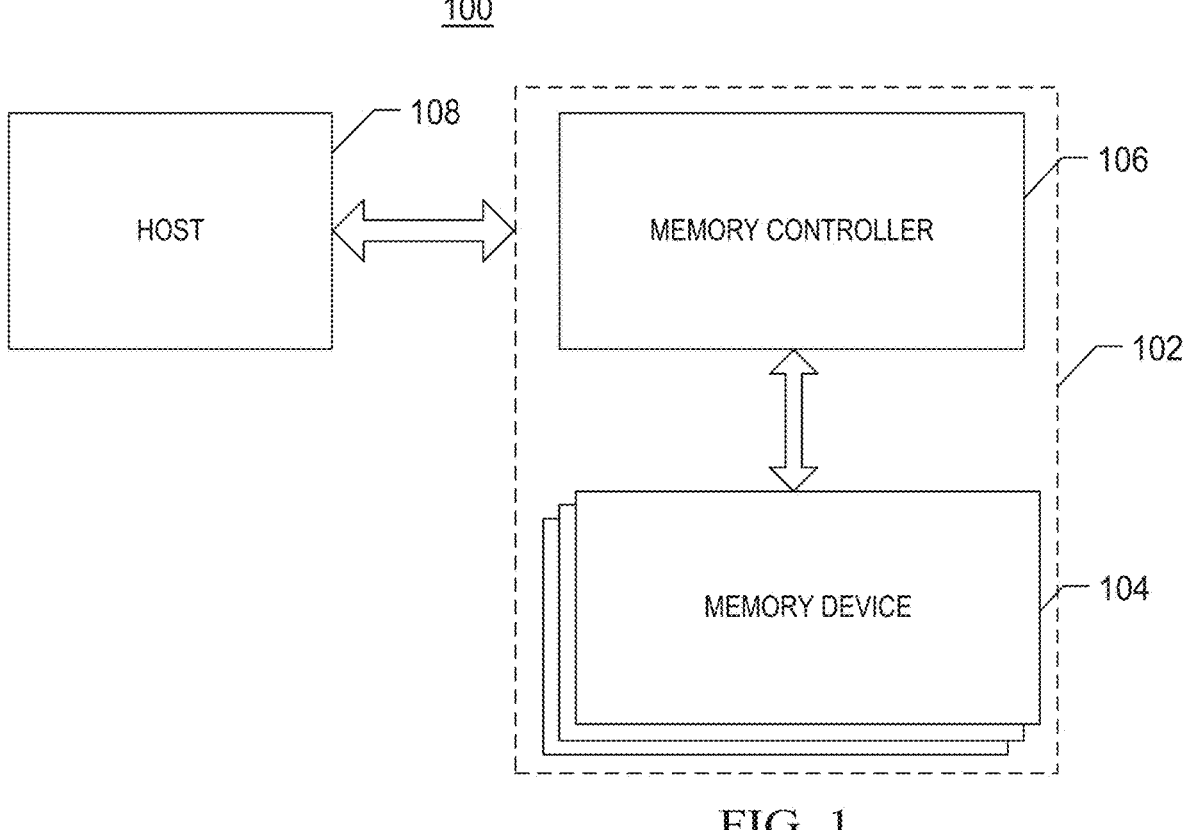
FIG. 1 is a schematic diagram of an example system with a memory system of an example according to the present application.

The technical solutions in implementations of the present application will be clearly and completely described below in conjunction with the implementations and accompanying drawings, and the described implementations are only some, and not all, of the implementations of the present application. All other implementations obtained by those skilled in the art based on the implementations in the present application belong to the claimed scope of the present application.

In the following description, numerous details are given in order to provide a more thorough understanding of the present application. It will be apparent to one skilled in the art that the present application may be practiced without one or more of these details.

In the accompanying drawings, size of a layer, a region, an element and their relative sizes may be exaggerated for clarity. Like reference numerals refer to like elements throughout.

It will be understood that when an element or layer is referred to as being "on," "adjacent to," "connected to" or "coupled to" another element or layer, it may be directly on, adjacent to, connected to or coupled to another element or layer, or intervening elements or layers may be present. In contrast, when an element is referred to as being "directly on," "directly adjacent to," "directly connected to" or "directly coupled to" another element or layer, there is no intervening elements or layers present. It will be understood that, although the terms first, second, third etc., may be used to describe various elements, components, regions, layers and/or parts, these elements, components, regions, layers and/or parts should not be limited by these terms. These terms are only used to distinguish one element, component, region, layer or part from another element, component, region, layer or part. Thus, a first element, component, region, layer or part discussed below may be termed as a second element, component, region, layer or part without departing from the teachings of the present application. When a second element, component, region, layer or part is discussed, it does not indicate that a first element, component, region, layer or part necessarily presents in the present application.

The spatially relative terms such as "beneath", "below", "lower", "under", "above", "on", etc., may be used herein for ease of description to describe one element or feature's relationship to another element(s) or feature(s) as illustrated in the figures. It will be understood that the spatially relative terms are intended to encompass different orientations of the device in use or operations in addition to the orientation depicted in the figures. For example, if the device in the appended drawings is turned over, an element or a feature described as "below" or "beneath" or "under" another element or feature would then be oriented "above" another element or feature. Thus, example terms "below" and "under" may encompass both directions of up and down. A device may be otherwise oriented (rotated 90 degrees or at other orientations) and the spatially relative descriptors used herein should be interpreted accordingly.

A term used herein is for the purpose of describing a particular example only and is not to be considered as a limitation of the present application. As used herein, the singular forms "a", "an" and "said/the" are intended to include the plural forms as well, unless the context clearly dictates otherwise. It should also be understood that the terms "consists of" and/or "comprising", when used in this description, identify the presence of stated features, integers, operations, operations, elements and/or parts, but do not exclude the presence or addition of one or more other features, integers, operations, operations, elements, parts and/or groups. As used herein, the term "and/or" includes any and all combinations of the associated listed items.

In order to thoroughly understand the present application, detailed operations and detailed structures will be provided in the following description, so as to explain the technical solution of the present application. Preferred examples of the present application are described in detail as follows, however, the present application may have examples other than these detailed descriptions.

Memory devices in examples of the present application include but are not limited to a three-dimensional NAND memory, and for ease of understanding, a three-dimensional NAND memory is used as an example for illustration.

As described above, memory systems may be provided in electronic devices such as embedded systems and voice, image, and data storage products. As the speed requirements of these products for a series of access operations (e.g., read operation and write operation) continue to increase, performing a series of access operations (e.g., read operation and write operation) quickly to meet performance requirements of a user may cause excessive heat to be accumulated in the memory system. Thus, the performance of the memory system is negatively impacted.

FIG. 1 illustrates a block diagram of an example system 100 with memory devices in accordance with some aspects of the present application. The system 100 may be a mobile phone, a desktop computer, a laptop computer, a tablet, a vehicle computer, a gaming console, a printer, a positioning device, a wearable electronic device, a smart sensor, a Virtual Reality (VR) device, an Augment Reality (AR) device, or any other suitable electronic devices having memory device therein. As shown in in FIG. 1, system 100 may include a host 108 and a memory system 102, and the memory system 102 has one or more memory devices 104 and a memory controller 106. The host 108 may be a processor of an electronic device (e.g., a Central Processing Unit (CPU)) or a System of Chip (SoC) (e.g., an Application Processor (AP)). Host 108 may be configured to send data to or receive data from memory device 104.

According to some implementations, memory controller 106 is coupled to memory device 104 and host 108 and is configured to control memory device 104. Memory controller 106 may manage data stored in memory device 104 and communicate with host 108. In some implementations, the memory controller 106 is designed to operate in low duty cycle environments, e.g., Secure Digital (SD) card, Compact Flash (CF) card, Universal Serial Bus (USB) flash drive, or other media for use in electronic devices such as personal computer, digital camera, mobile phone, etc.

In some implementations, the memory controller 106 is designed to operate in high duty cycle environments, e.g., Solid State Drive (SSD) or Embedded Multi Media Card (eMMC), where SSD or eMMC is used as data storage for mobile devices such as smartphone, tablet computer, laptop computer, and enterprise storage array.

Memory controller 106 may be configured to control operations of memory device 104, e.g., read, erase and program operations. Memory controller 106 may also be configured to manage various functions related to data stored or to be stored in memory device 104, including but not limited to bad block management, garbage collection, logical-to-physical address translation, wear leveling, etc. In some implementations, memory controller 106 is further configured to process Error Correction Code (ECC) related to data read from or written to memory device 104.

The memory controller 106 may also perform any other suitable functions, e.g., formatting the memory device 104. Memory controller 106 may communicate with external devices (e.g., host 108) according to a particular communication protocol. For example, the memory controller 106 may communicate with external devices through at least one of various interface protocols, such as USB protocol, MMC protocol, Peripheral Component Interconnect (PCI) protocol, PCI Express (PCI-E) protocol, Advanced Technology Attachment (ATA) protocol, Serial ATA protocol, Parallel ATA protocol, Small Computer Small Interface (SCSI) protocol, Enhanced Small Disk Interface (ESDI) protocol, Integrated Drive Electronics (IDE) protocol, Firewire protocol, etc.

The memory controller 106 and one or more memory devices 104 may be integrated into various types of storage devices, e.g., included in the same package (e.g., Universal Flash Storage (UFS) package or eMMC package). That is, memory system 102 may be implemented and packaged into different types of end electronic products.

Figure 2B:
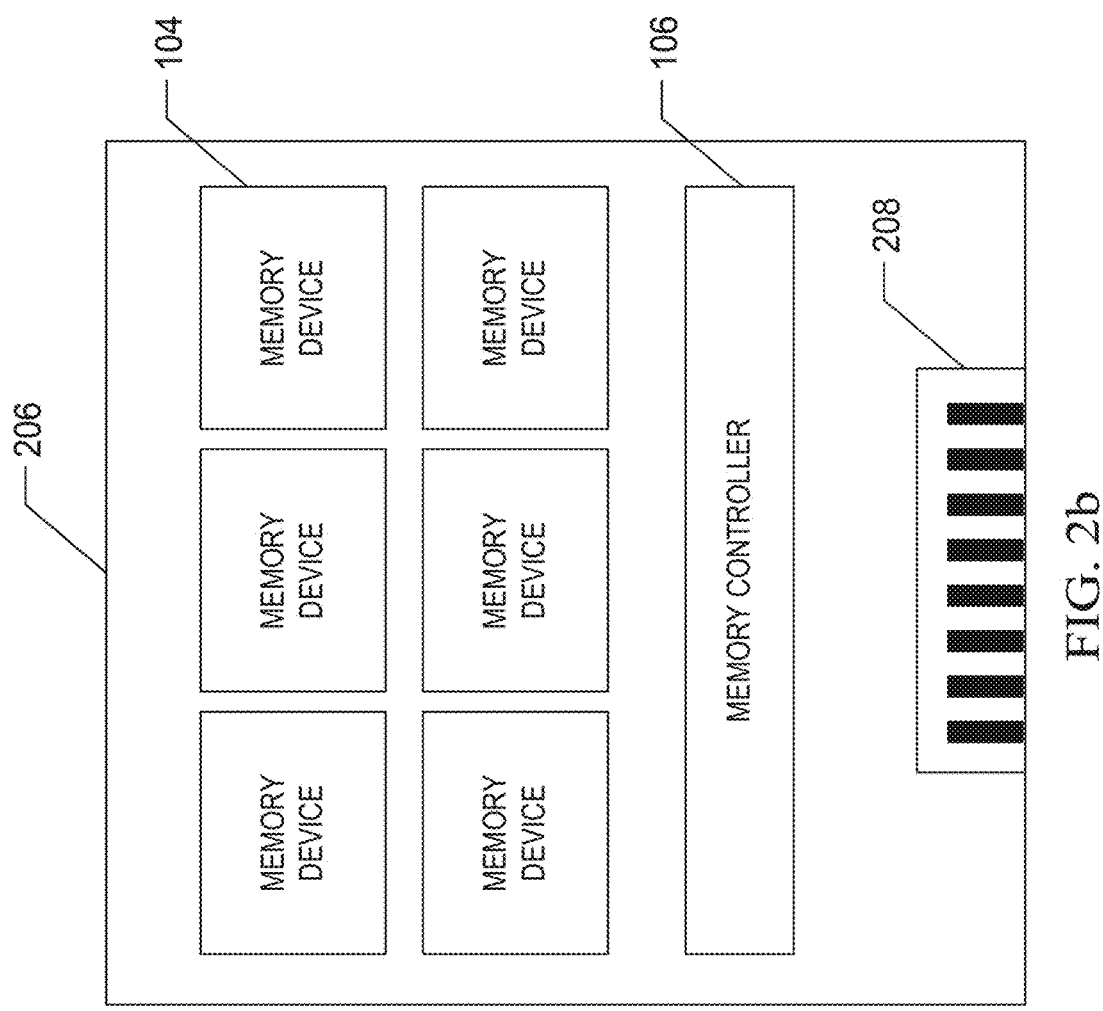
FIG. 2b is a schematic diagram of an example solid state drive with a memory system according to an example of the present application.
Figure 2A:
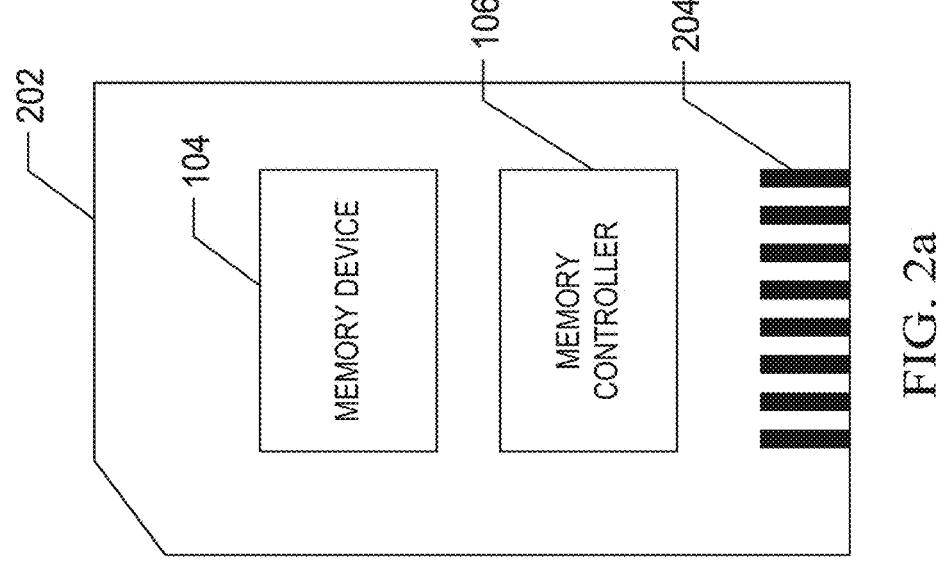
FIG. 2a is a schematic diagram of an example memory card with a memory system according to an example of the present application.

In one example as shown in FIG. 2a, memory controller 106 and a single memory device 104 may be integrated into a memory card 202. Memory card 202 may include a PC card (PCMCIA, personal computer memory card international association), a CF card, a smart media (SM) card, a memory stick, a multimedia card (MMC, RS-MMC, MMC-micro), an SD card (SD, miniSD, microSD, SDHC), a UFS, etc. Memory card 202 may further include a memory card connector 204 coupling memory card 202 with a host (e.g., host 108 in FIG. 1).

In another example as shown in FIG. 2b, memory controller 106 and a plurality of memory devices 104 may be integrated into a SSD 206. SSD 206 may further include an SSD connector 208 coupling the SSD 206 with a host (e.g., host 108 in FIG. 1). In some implementations, the storage capacity and/or operating speed of SSD 206 is greater than the storage capacity and/or operating speed of memory card 202.

Figure 3:
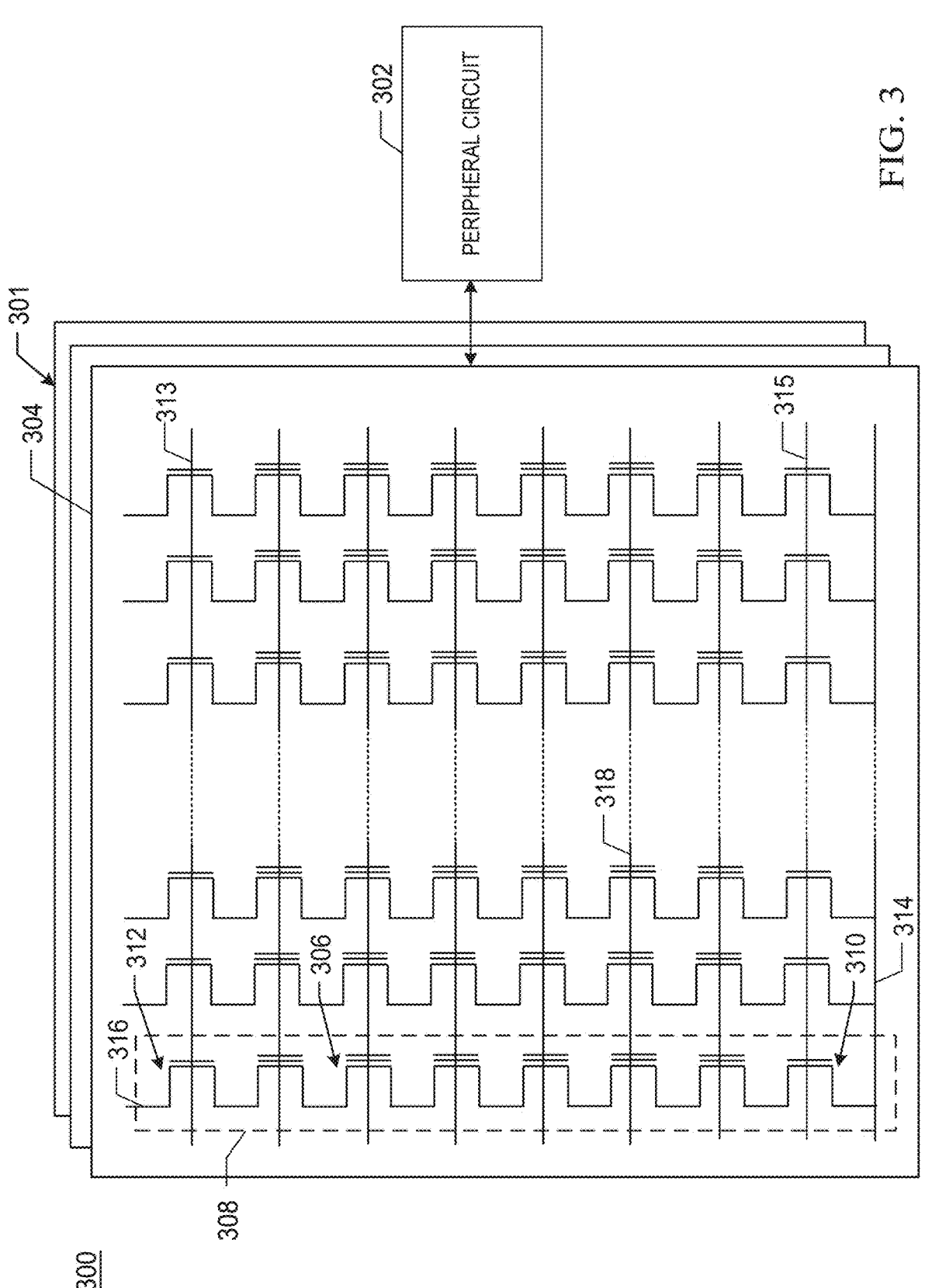
FIG. 3 is a schematic diagram of an example memory including a peripheral circuit according to an example of the present application.

FIG. 3 illustrates a schematic circuit diagram of an example memory device 300 including peripheral circuits according to some aspects of the present application. Memory device 300 may be an example of memory device 104 in FIG. 1. The memory device 300 may include a memory cell array 301 and a peripheral circuit 302 coupled to the memory cell array 301. Taking memory cell array 301 being a three-dimensional NAND memory cell array as an example for illustration, where memory cells 306 is a NAND-type memory cell, memory cells 306 are provided in the form of an array of memory strings 308, each memory string 308 extending vertically over a substrate (not shown). In some implementations, each memory string 308 includes a plurality of memory cells 306 coupled in series and stacked vertically. Each memory cell 306 may retain a continuous analog value, e.g., voltage or charge, depending on the number of electrons trapped within the area of the memory cell 306. Each memory cell 306 may be a "floating gate" type memory cell including a floating gate transistor, or a "charge trap" type memory cell including a charge trap transistor.

In some implementations, each memory cell 306 is a Single-level Cell (SLC) that has two possible memory states and may thus store one bit of data. For example, a first memory state of "0" may correspond to a first voltage range, and a second memory state of "1" may correspond to a second voltage range. In some implementations, each memory cell 306 is a Multi-Level Cell (MLC) capable of storing more than a single bit of data in more than four memory states. For example, an MLC may store two bits per cell (also known as a Double-Level Cell), three bits per cell (also known as a Trinary-Level Cell (TLC)), four bits per cell (also known as a Quad-Level Cell (QLC)), five bits per cell (also known as a Penta-level cell (PLC)), or more than five bits per cell. Each MLC can be programmed to assume a range of possible nominal storage values. In one example, if each MLC stores two bits of data, the MLC can be programmed to assume one of three possible programming levels from the erased state through writing one of three possible nominal storage values into the cell. A fourth nominal storage value may be used for the erase state.

It should be noted that the storage state mentioned here is also the storage state of the memory cell mentioned in the present application. Different memory cells have different numbers of storage states. e.g., a SLC type memory cell has 2 storage states (i.e., two memory states), where the 2 storage states include a program state and an erase state. As another example, an MLC type memory cell has 4 storage states, where the four storage states include one erase state and three program states. As yet another example, a TLC type memory cell has 8 storage states, where the 8 storage states include one erase state and seven program states. In some implementations, the QLC type memory cell has 16 storage states, where the 16 storage states include one erase state and fifteen program states.

As shown in FIG. 3, each memory string 308 may include a bottom select gate (BSG) 310 (also referred to as a source side select gate) at its source terminal and a top select gate (TSG) 312 (also referred to as a drain side select gate) at its drain terminal. BSG 310 and TSG 312 may be configured to activate the selected memory cell string 308 during read operation and program operation. In some implementations, the sources of memory strings 308 in a same memory block 304 are coupled through a same source line (SL) 314 (e.g., a common SL). In other words, according to some implementations, all memory strings 308 in a same memory block 304 have an array common source (ACS). According to some implementations, TSG 312 of each memory string 308 is coupled to a corresponding bit line (BL) 316 from which data may be read or written via an output bus (not shown). In some implementations, each memory string 308 is configured to be selected or deselected through applying a select voltage (e.g., above the threshold voltage of a transistor with a TSG 312) or a deselect voltage (e.g., 0V) to the corresponding TSG 312 via one or more TSG lines 313 and/or applying a select voltage (e.g., above the threshold voltage of a transistor with a BSG 310) or a deselect voltage (e.g., 0V) to the corresponding BSG 310 via one or more BSG lines 315.

As also shown in FIG. 3, a memory string 308 may be organized into a plurality of memory blocks 304, each of which may have a common source line 314 (e.g., coupled to ground). In some implementations, each memory block 304 is the basic data unit for an erase operation, i.e., all memory cells 306 on the same memory block 304 are erased simultaneously. To erase the memory cell 306 in the selected memory block 304, the source line 314 coupled to the selected memory block 304 and to the unselected memory blocks 304 in the same plane as the selected memory block 304 may be biased with an erase voltage (Vers) (e.g., a high positive voltage (e.g., 20V or higher)). It should be understood that, in some examples, erase operations may be performed at the half-memory block level, at the quarter-memory block level, or at a level with any suitable number of memory blocks or any suitable fraction of memory blocks. The memory cells 306 of adjacent memory strings 308 may be coupled through a word line 318 that selects which row of memory cells 306 is affected by read and program operations.

Referring to FIG. 3, each memory cell 306 of the plurality of memory cells is coupled to a corresponding word line 318, and each memory string 308 is coupled to a corresponding bit line 316 through a corresponding select transistor (e.g., top select transistor (TSG) 312).

Figure 4:
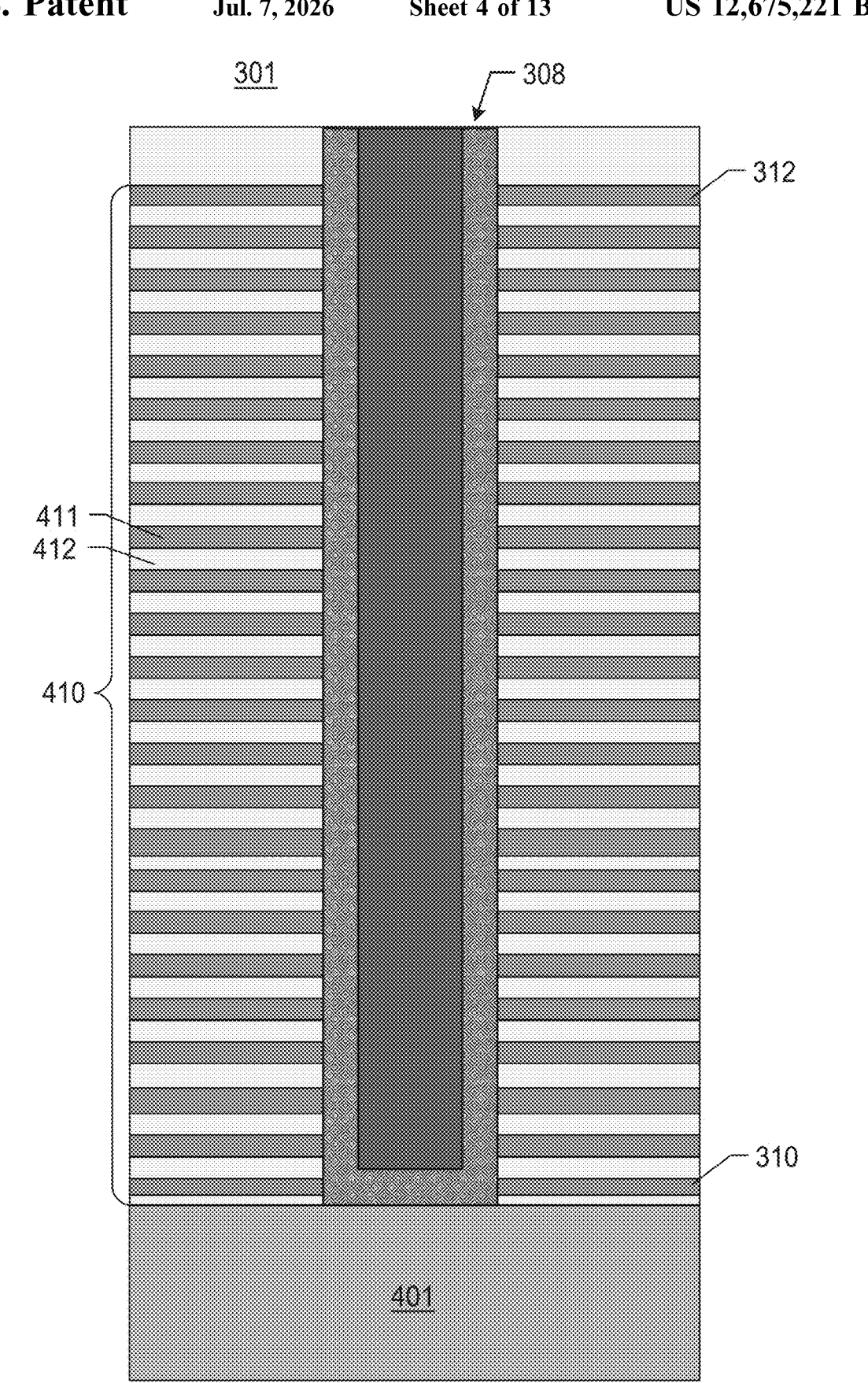
FIG. 4 is a schematic cross-sectional view of a memory cell array including NAND-type memory strings according to an example of the present application.

FIG. 4 illustrates a schematic cross-sectional view of an example memory cell array 301 including memory strings 308, e.g., NAND, according to some aspects of the present application. As shown in FIG. 4, the NAND memory cell array 301 may include a stacked structure 410, the stacked structure 410 including a plurality of gate layers 411 and a plurality of insulating layers 412 alternately stacked in sequence, and the channel structure vertically penetrating through the gate layers 411 and the insulating layers 412. The channel structure is coupled to each gate layer to form a memory cell, and the channel structure is coupled to multiple gate layers in the stacked structure 410 to form the memory string 308. Gate layers 411 and the insulating layers 412 may be stacked alternately, and two adjacent gate layers 411 are separated by an insulating layer 412.

A constituent material of the gate layer 411 may include a conductive material. Conductive materials include, but are not limited to, tungsten (W), cobalt (Co), copper (Cu), aluminum (Al), polysilicon, doped silicon, silicide, or any combination thereof. In some examples, each gate layer 411 includes a metal layer, e.g., a tungsten layer. In some examples, each gate layer 411 includes a doped polysilicon layer. Each gate layer 411 may include a control gate surrounding a memory cell. A gate layer 411 at the top of a stacked structure 410 may extend laterally as an upper selection gate line, a gate layer 411 at the bottom of a stacked structure 410 may extend laterally as a lower selection gate line, and a gate layer 411 extending laterally between a upper selection gate line and a lower selection gate line may serve as a word line layer.

In some examples, a stacked structure 410 may be disposed on a substrate 401. The substrate 401 may include silicon (e.g., monocrystalline silicon), silicon germanium (SiGe), gallium arsenide (GaAs), germanium (Ge), silicon-on-insulator (SOI), germanium-on-insulator (GOI), or any other appropriate material.

In some examples, a memory string 308 includes a channel structure extending vertically through stacked structure 410. In some implementations, a channel structure includes a channel hole filled with semiconductor material(s) (e.g., as a semiconductor channel) and dielectric material(s) (e.g., as a memory film). In some implementations, a semiconductor channel includes silicon, e.g., polysilicon. In some implementations, a memory film is a composite dielectric layer including a tunneling layer, a storage layer (also referred to as a "charge trapping/storage layer"), and a blocking layer. A channel structure may have a cylindrical shape (e.g., a pillar shape). According to some implementations, a semiconductor channel, a tunneling layer, a storage layer and a blocking layer are radially arranged in this order from the center of the pillar toward the outer surface of the pillar. A tunneling layer may include silicon oxide, silicon oxynitride, or any combination thereof. A storage layer may include silicon nitride, silicon oxynitride, or any combination thereof. A blocking layer may include silicon oxide, silicon oxynitride, a high-k (high-k) dielectric, or any combination thereof. In an example, a memory film may include a composite layer of silicon oxide/silicon oxynitride/silicon oxide (ONO).

Figure 5:
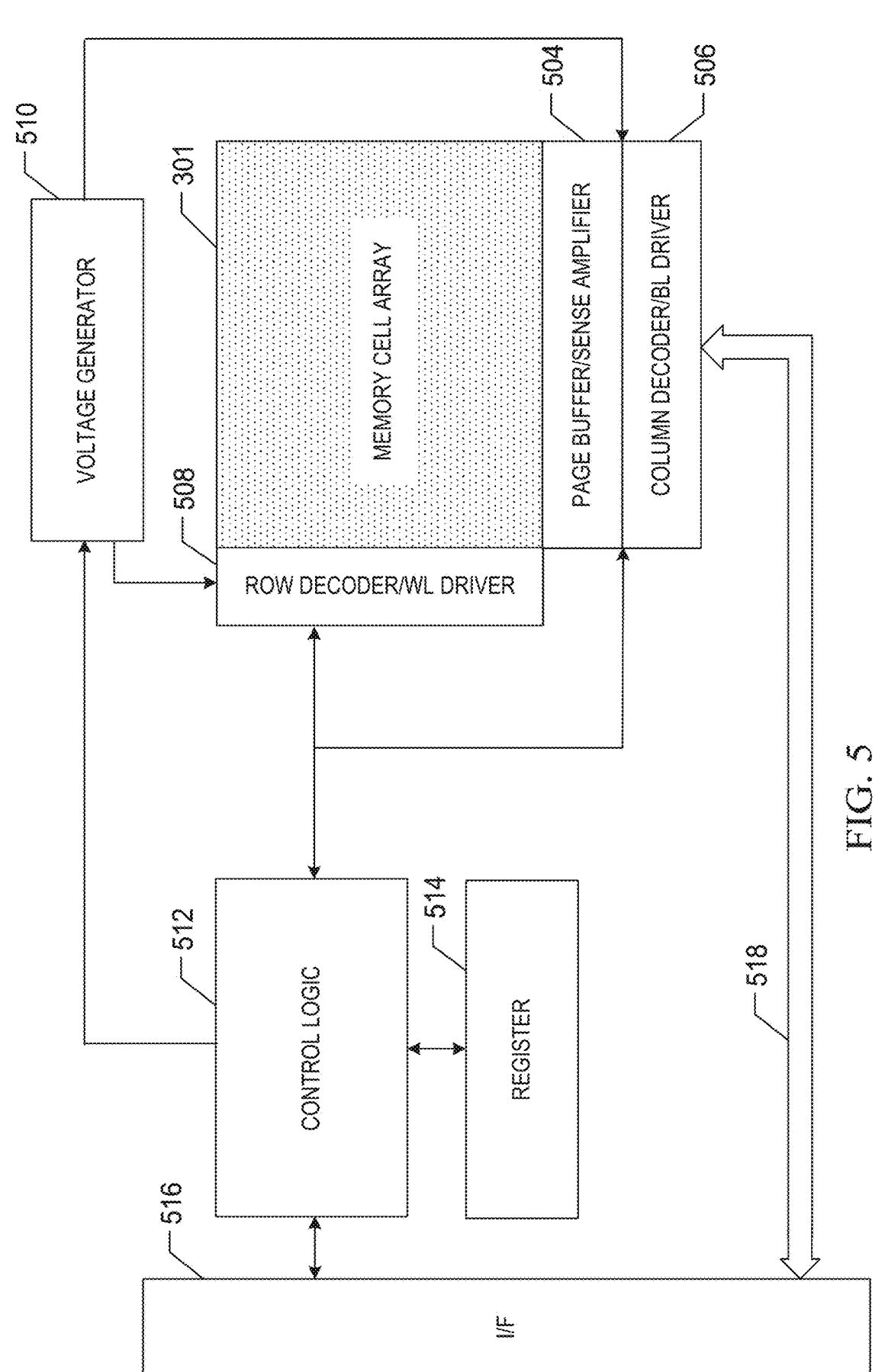
FIG. 5 is a schematic diagram of an example memory device including a memory cell array and peripheral circuit according to an example of the present application.

Referring back to FIG. 3, the peripheral circuit 302 may be coupled to the memory cell array 301 through bit line 316, word line 318, source line 314, BSG line 315, and TSG line 313. The peripheral circuit 302 may include any suitable analog, digital, and mixed-signal circuit for facilitating operation of the memory cell array 301 through applying a voltage signal and/or a current signal to and sensing voltage signal and/or current signal from each target memory cell 306 via bit line 316, word line 318, source line 314, BSG line 315, and TSG line 313. The peripheral circuit 302 may include various types of peripheral circuits formed with metal-oxide-semiconductor (MOS) technology. For example, FIG. 5 illustrates some example peripheral circuits, peripheral circuit 302 includes page buffer/sense amplifier 504, column decoder/bit line driver 506, row decoder/word line driver 508, voltage generator 510, control logic 512, register 514, interface 516 and data bus 518. It should be understood that in some examples, additional peripheral circuits not shown in FIG. 5 may also be included.

The page buffer/sense amplifier 504 may be configured to read data from and program (write) data to the memory cell array 301 according to control signals from the control logic 512. In one example, the page buffer/sense amplifier 504 may store programming data (written data) to be programmed into the memory cell array 301. In another example, the page buffer/sense amplifier 504 may perform a programming verify operation to ensure that data has been correctly programmed into memory cell 306 coupled to selected word line 318. In yet another example, the page buffer/sense amplifier 504 may also sense a low power signal from bit line 316 representing a data bit stored in memory cell 306 and amplify a small voltage swing to a recognizable logic level during a read operation. The column decoder/bit line driver 506 may be configured to be controlled by control logic 512 and to select one or more memory strings 308 through applying a bit line voltage generated from voltage generator 510.

The row decoder/word line driver 508 may be configured to be controlled by control logic 512 and select/deselect memory block 304 of memory cell array 301 and select/deselect word line 318 of memory block 304. The row decoder/word line driver 508 may also be configured to drive word line 318 with a word line voltage generated from voltage generator 510. In some implementations, the row decoder/word line driver 508 may also select/deselect and drive the BSG line 315 and the TSG line 313. As described in detail below, the row decoder/word line driver 508 is configured to perform programming operations on the memory cells 306 coupled to the selected word line 318. The voltage generator 510 may be configured to be controlled by the control logic 512, and generate word line voltage (e.g., read voltage, programming voltage, pass voltage, channel boost voltage, verify voltage, etc.), bit line voltage and source line voltage to be supplied to the memory cell array 301.

The control logic 512 may be coupled to each of other portions of the peripheral circuit described above, and configured to control operations of each of the other portions of the peripheral circuit. The register 514 may be coupled to the control logic 512 and include status register, command register and address register for storing status information, command operation code (OP code) and command address for controlling operations of each of the peripheral circuits. The interface (I/F) 516 may be coupled to control logic 512 and act as a control buffer to buffer and relay control commands received from a host (not shown) to control logic 512 and to buffer and relay status information received from the control logic 512 to the host. Interface 516 may also be coupled to column decoder/bit line driver 506 via data bus 518 and act as a data I/O interface and data buffer to buffer and relay data to/from memory cell array 301.

In order to prevent the memory system from accumulating too much heat when quickly performing a large number of access operations, various Thermal Throttling strategies (also known as thermal throttling strategies) are usually employed.

Figure 6:
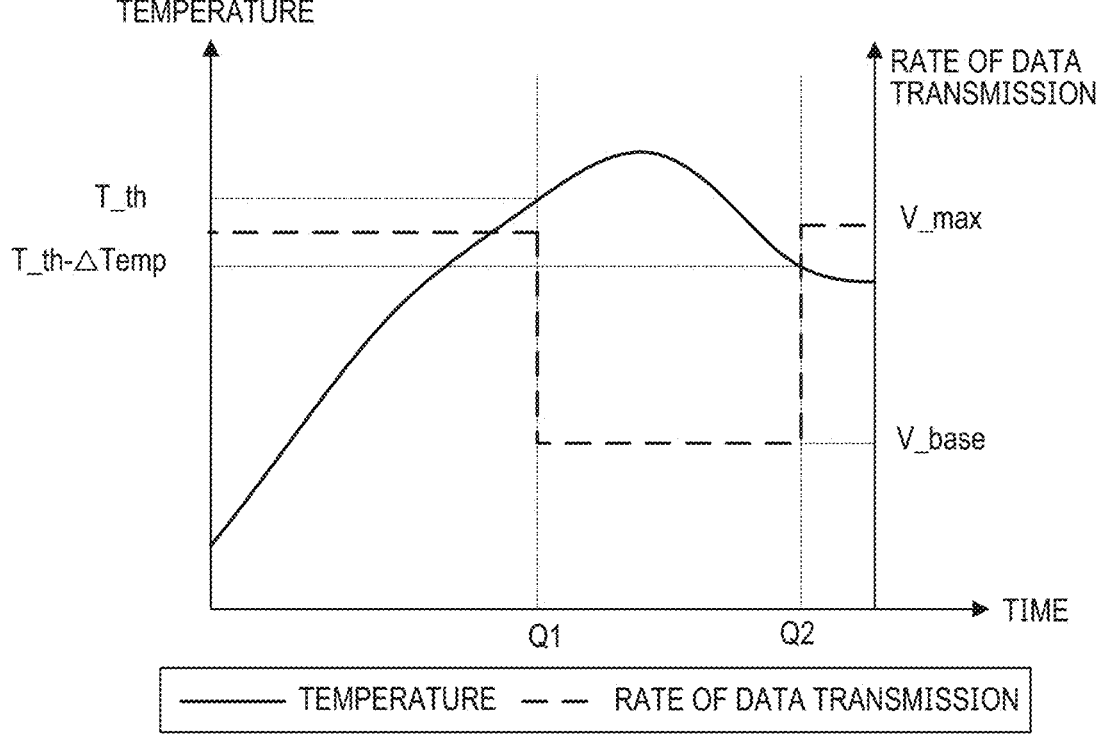
FIG. 6 illustrates a schematic diagram of a thermal throttling curve of an example thermal throttling strategy of a memory system.

FIG. 6 illustrates a schematic diagram of a thermal throttling curve of an example thermal throttling strategy of a memory system. As shown in FIG. 6, the maximum rate of data transmission of the memory system is V_max, and a temperature detection is required to be performed inside the memory system at certain intervals. After the temperature of the memory system detected at time Q1 exceeds the set temperature threshold T_th, the rate of data transmission of the memory system is reduced to the basic rate of data transmission V_base, such that the temperature of the memory system gradually stops rising and then falls back to a safe range of temperature. After the temperature of the memory system is detected to be below the safe temperature T_th-ΔTemp at time Q2, the memory system returns to normal read and write performance and the rate of data transmission of the memory system is increased to the maximum rate of data transmission V_max.

Here, the set temperature threshold T_th and temperature difference ΔTemp may be empirical values, or they may be default values configured when the memory system leaves the factory. The default value is obtained through extensive simulation experiments before the memory system leaves the factory. For example, the range of the set temperature threshold T_th is set to 70° C.-75° C., and the range of the temperature difference ΔTemp is set to 3° C.-5° C. In one example, the set temperature threshold T_th may be 70° C., 72° C. or 75° C., and the temperature difference ΔTemp may be 3° C., 4° C., or 5° C.

It should be noted that the rate of data transmission of the memory system refers to the rate of data transmission or data traffic of read/write between the memory device and the memory controller in the memory system. A table for the rate of data transmission is usually represented in terms of the number of bits or bytes of data transferred per second (e.g., MB/s). A higher rate of data transmission means a better performance for a memory system, which may meet the demands of high read and write speeds more quickly.

The method of controlling the temperature of the memory system by reducing the rate of data transmission of the memory system described above is intended to control the overall temperature of the memory system and prevent overheating. Therefore, the temperature of the memory system may be not the temperature at a certain location or component, but the comprehensive temperature at various components within the memory system. In some examples, the temperature of the memory system represents the average temperature of components such as a memory controller, processor, memory device, etc.

In the thermal throttling strategy shown in FIG. 6, once the temperature of the memory system reaches or exceeds the set temperature threshold T_th, a measure for a single performance reduction will be taken, i.e., reducing the rate of data transmission to reduce heat generation. However, immediately reducing performance when the temperature of the memory system reaches a critical point may lead to a sudden performance drop in high-load tasks, e.g., a large-scale data transfer or complex application running, seriously affecting the user experience.

Figure 7:
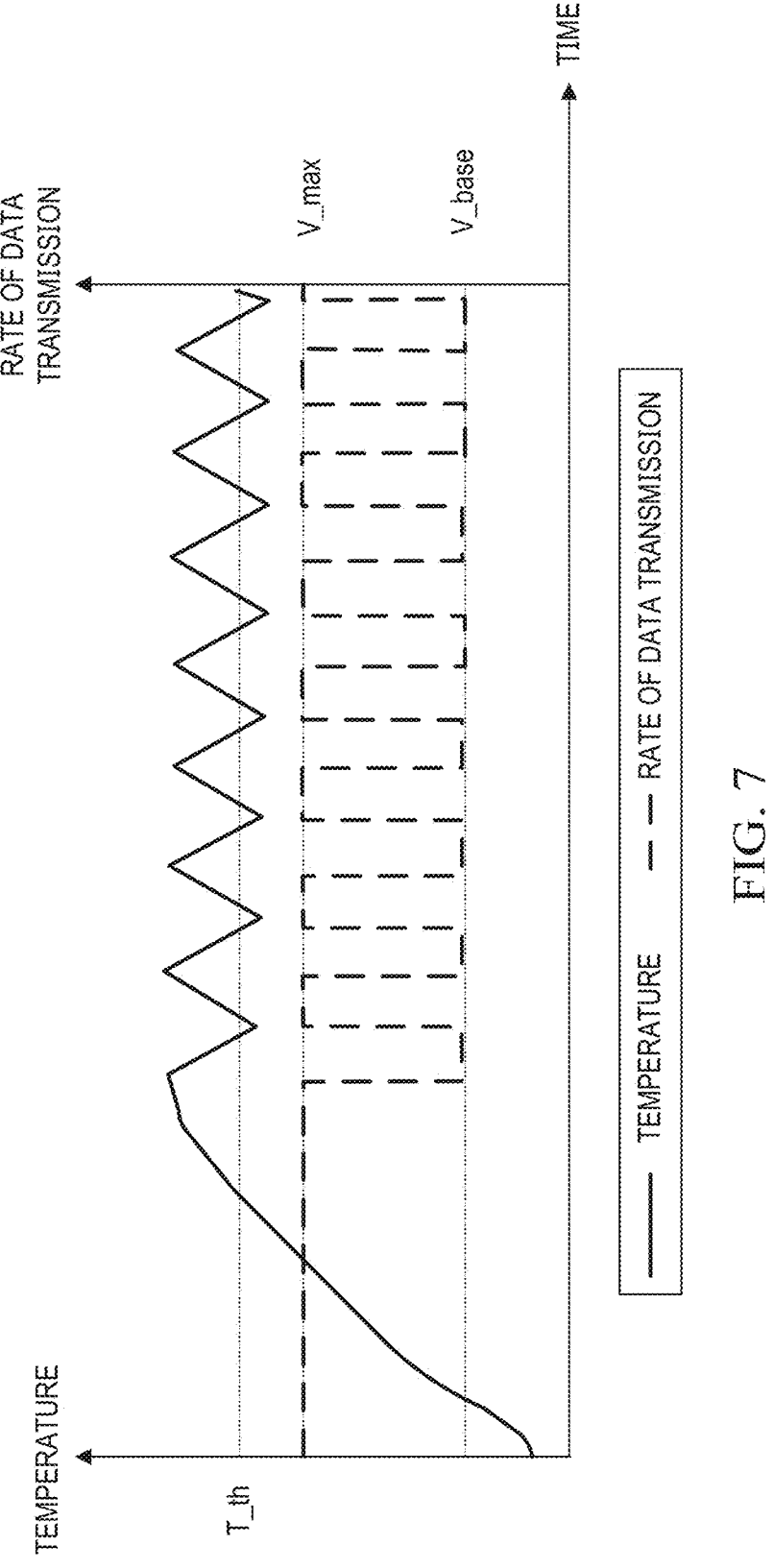
FIG. 7 illustrates a schematic diagram of the thermal throttling curve when the thermal throttling strategy shown in FIG. 6 is performed multiple times.

FIG. 7 illustrates a schematic diagram of the thermal throttling curve when the thermal throttling strategy shown in FIG. 6 is performed multiple times. As shown in FIG. 7, during the whole cycle of the operation of the memory system, after multiple executions of the single-stage thermal throttling strategy shown in FIG. 6, the temperature of the memory system and the rate of data transmission of the memory system fluctuate periodically over time, and the average rate of data transmission of the memory system is small. It should be understood that, although the single-stage thermal throttling strategy may control the temperature of the memory system to a certain extent, its performance stability is poor, therefore seriously affecting the user experience.

It should be noted that the temperature curve shown in FIG. 7 is a simplified diagram after multiple executions of the thermal throttling strategy shown in FIG. 6. The process of temperature variations may be understood with reference to FIG. 6 and related descriptions.

Figure 8:
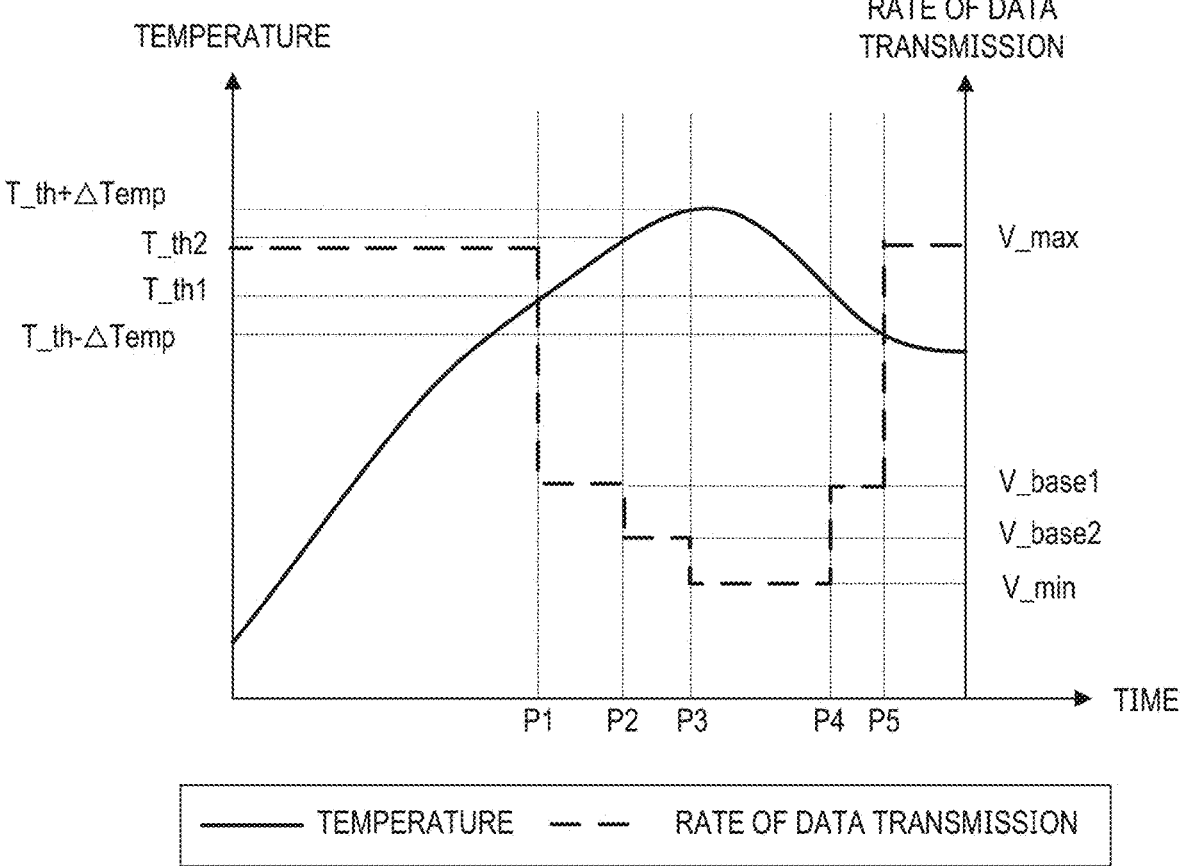
FIG. 8 illustrates a schematic diagram of a thermal throttling curve of another example thermal throttling strategy of a memory system.

FIG. 8 illustrates a schematic diagram of a thermal throttling curve of another example thermal throttling strategy of a memory system. As shown in FIG. 8, the maximum rate of data transmission of the memory system is V_max, and a temperature detection is required to be performed inside the memory system at certain intervals. After it is detected that the temperature of the memory system exceeds a defined first temperature threshold T_th1, the rate of data transmission of the memory system is reduced to a first rate of data transmission V_base1, which occurs at the time instance P1. By reducing the rate of data transmission of the memory system to the first rate of data transmission V_base1, the temperature rise rate of the memory system may be reduced. However, when the ambient temperature is too high, the temperature of the memory system may continue to rise, thus it is required to further reduce the rate of data transmission of the memory system. Next, after it is detected that the temperature of the memory system exceeds a defined second temperature threshold T_th2, the rate of data transmission of the memory system is reduced to a second rate of data transmission V_base2, which occurs at the time instance P2. After it is detected that the temperature of the memory system exceeds a defined maximum temperature threshold T_th+ΔTemp, the rate of data transmission of the memory system is reduced to the lowest rate of data transmission V_min, which occurs at the time instance P3.

Next after, at time instance P4, detecting that that the temperature of the memory system has dropped to the first temperature threshold T_th1, the rate of data transmission of the memory system is increased to the first rate of data transmission V_base1. Finally, at time instance P5, detecting that the temperature of the memory system has dropped to a safe temperature T_th-ΔTemp, the memory system returns to normal read and write performance and the rate of data transmission of the memory system is increased to the maximum rate of data transmission V_max.

Here, the defined first temperature threshold T_th1, the defined second temperature threshold T_th2, the maximum temperature threshold T_th+ΔTemp and the safe temperature T_th-ΔTemp may be empirical values, or they may be default values configured when the memory system leaves the factory, wherein the default values are obtained through extensive simulation experiments before the memory system leaves the factory. For example, the maximum temperature threshold T_th+ΔTemp may be 80° C., the defined second temperature threshold T_th2 may be 70° C., the defined first temperature threshold T_th1 may be 67° C., and the safe temperature T_th-ΔTemp may be 65° C.

The multi-stage thermal throttling strategy shown in FIG. 8 has a plurality of temperature thresholds, and compared with the single-stage thermal throttling strategy shown in FIG. 6, the rate of data transmission of the memory may be controlled more accurately. A user may not easily sense a significant decrease in performance for a memory system during a high-load task, which reduces the negative impact on user experience to a certain extent. However, multi-stage strategies are more complex and may increase costs.

In addition, fixed preset values may be used in both the single-stage thermal throttling strategy and the multi-stage thermal throttling strategy to reduce the rate of data transmission during the thermal throttling process (e.g., the basic rate of data transmission V_base, the second rate of data transmission V_base2, etc.). This lacks flexibility for different temperature and performance demands in different operating modes. In addition, single-stage thermal throttling strategies and multi-stage thermal throttling strategies have limited effect on thermal throttling when the ambient temperature is high or ventilation and heat dissipation are poor, which may cause the memory system to operate at a high temperature for a long time.

Based on one or more of the problems described above, an example of the present application proposes a method for operating a memory system.

FIG. 9 is a schematic flowchart of an implementation of a method for operating a memory system provided by an example of the present application. As shown in FIG. 9, in one example, the method for operating a memory system includes the following operations:

Operation S10: obtaining a temperature parameter at a first time instance and a temperature parameter at a second time instance, a rate of data transmission at the first time instance, and a thermal throttling parameter at the first time instance.

Operation S20: in accordance with the temperature parameters at the first and second time instances, the rate of data transmission at the first time instance, and the thermal throttling parameter at the first time instance, determining an upper limit of the rate of data transmission at a third time instance; wherein, the second time instance is at least one time instance before the first time instance, and the third time instance is a time instance after the first time instance.

Here, the structure of the memory system refers to the aforementioned FIG. 1 and will not be repeated here.

In some examples, when only one temperature sensor is disposed inside the memory system, the temperature measured by the temperature sensor is the temperature parameter of the memory system.

In some examples, when a plurality of temperature sensors are disposed inside the memory system, obtaining the temperature parameters of the memory system includes: obtaining multiple temperature measurement data from temperature sensors at different locations included in the memory system, and obtaining the temperature parameters with the multiple temperature measurement data, and by a temperature composite algorithm. Thus, the temperature parameter may reflect the overall temperature of the memory system.

Taking the memory system including three-dimensional NAND memory and memory controller as an example, the temperature composite algorithm may be implemented by the following calculation formula: $T=\max\{Tnand, Tcontroller\}$, wherein T is the temperature parameter of the memory system, Tnand is the maximum value among multiple temperature measurement data of temperature sensors at a plurality of locations of the three-dimensional NAND memory, and Tcontroller is the maximum value among multiple temperature measurement data of temperature sensors at a plurality of locations of the memory controller.

In some examples, the temperature composite algorithm may also be implemented by the following calculation formula: $T=(Tcontroller-Tcom+Tnand)/2$, where T is the temperature parameter of the memory system, Tnand is the maximum value among multiple temperature measurement data of temperature sensors at a plurality of locations of the three-dimensional NAND memory, and Tcontroller is the maximum value among multiple temperature measurement data of temperature sensors at a plurality of locations of the memory controller. Tcom is a compensation value which is to adjust the impact for temperature of the memory controller. A compensation value may be adjusted in accordance with memory systems and requirements, in order to meet requirements of performance and temperature management.

It should be noted that the rate of data transmission of the memory system refers to the rate of data transmission or read/write data traffic between the memory device and the memory controller of the memory system. A rate of data transmission table may be represented in terms of the number of bits or bytes of data transferred per second (e.g., MB/s). A higher rate of data transmission may mean a better performance from a memory system, which may meet the demands of high read and write speeds more quickly.

Figure 10:
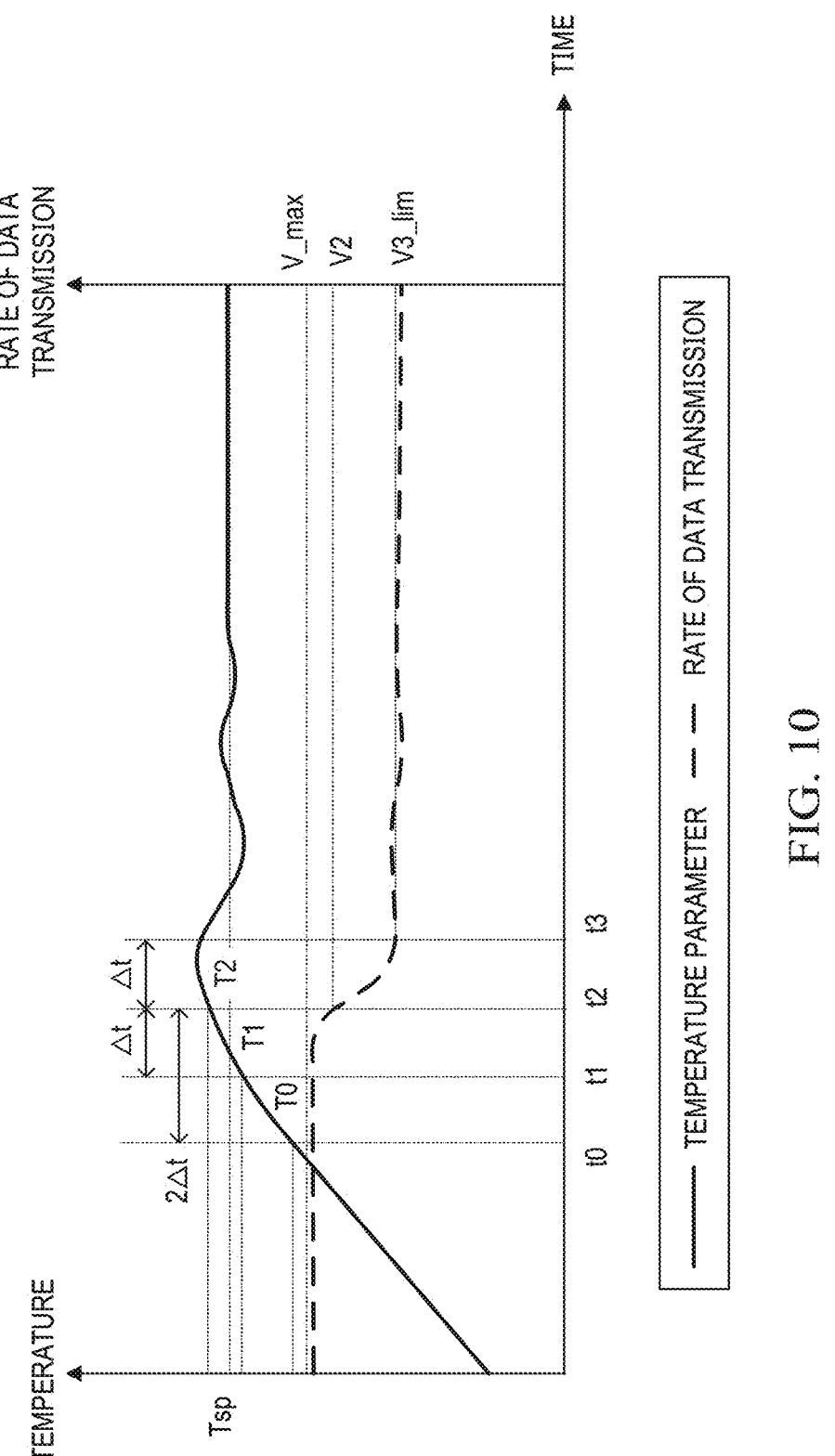
FIG. 10 is a schematic diagram of a thermal throttling curve of a thermal throttling strategy provided by an example of the present application.

FIG. 10 is a schematic diagram of a thermal throttling curve of a thermal throttling strategy provided by an example of the present application. FIG. 11 is a flowchart of a method for operating a memory system provided by an example of the present application. The process of determining thermal throttling will be described in detail below with reference to FIGS. 10 and 11.

Operation S201 is performed when the memory system is powered on.

In the operation S202, the temperature parameters at the first and second time instances, the rate of data transmission at the first time instance, and a corresponding thermal throttling parameter in an operating mode at the first time instance are obtained; the thermal throttling parameters being different in different operating modes; the thermal throttling parameter including a target control temperature and a proportion parameter, an integral parameter, and a differential parameter.

In some examples, any two adjacent ones of the time instances are separated by a preset period. It should be understood that a temperature detection is required to be performed inside the memory system every preset period. The duration of the preset period ranges from 1 s to 5 s. In one example, the duration of the preset period may be 1 s, 3 s, or 5 s.

In some examples, as shown in FIG. 10, the temperature parameter T2 at the first time instance t2, the temperature parameter T0 at the second time instance t0 separated from the first time instance t2 by two preset periods 2Δt, the temperature parameter T1 at the second time instance t1 separated from the first time instance t2 by one preset period Δt, the rate of data transmission V2 at the first time instance t2, and a corresponding thermal throttling parameter in an operating mode at the first time instance t2 are obtained; the thermal throttling parameters being different in different operating modes; the thermal throttling parameter including a target control temperature Tsp and a proportion parameter (Proportion, P), an integral parameter (Integral, I), and a differential parameter (Differential, D).

In some examples, determining the operating mode in which the memory system is at the first time instance includes obtaining the corresponding thermal throttling parameter in the operating mode at the first time instance in accordance with the determined operating mode.

In some implementations, the proportion parameter, integral parameter, and differential parameter in the corresponding operating mode which are optimal are obtained respectively for each of various operating modes of the memory system; a mapping table between the various operating modes and the corresponding optimal proportion parameters, integral parameters, and differential parameters is generated, the mapping table is stored, and a call in the corresponding operating mode is triggered.

In some implementations, a large number of simulation experiments are performed on the memory system before leaving the factory, and the proportion parameter, integral parameter, and differential parameter which are optimal in the corresponding operating mode are obtained respectively for each of various operating modes of the memory system.

For example, receiving commands for adjusting PID parameters from the memory system interface (e.g., the OS interface or debug interface) are implemented through Firmware (FW) development. The proportion parameter P, integral parameter I, and differential parameter D are adjusted in sequence. In one example, different workloads and data access modes, e.g., read-only, write-only, mixed read-write, etc., are simulated, where different operating modes are representative to simulate actual usage. At the beginning, the proportion parameter P is set to an initial value, usually an empirical value. At this point, the differential parameter D may be set to 0 and the integral parameter I may be set to 0. The fluctuation of the temperature parameter curve of the memory system in different operating modes is recorded, the proportion parameter P (the P value is generally adjusted from small to large) is gradually adjusted, and its impact on the temperature parameter curve of the memory system is observed. The temperature parameter curves in different proportion parameters P is analyzed, wherein the optimal proportion parameter P may cause the temperature parameter curve to change neither oscillate excessively nor lag.

After the optimal proportion parameters in different operating modes are determined, the optimal proportion parameters may be used and the differential parameter D is set to 0, the fluctuation of the temperature parameter curve of the memory system in different operating modes is recorded, the integral parameter I (the I value is generally adjusted from large to small) is gradually adjusted, and it is confirmed that when the period of temperature oscillation and amplitude in the temperature parameter curve are small, the corresponding integral parameter is the optimal integral parameter. Then, in accordance with the confirmed optimal proportion parameter and optimal integral parameter, the adjustment of the differential parameter D value is increased, and it is confirmed that the small range fluctuation amplitude of the temperature parameter curve decreases or disappears, and when the temperature parameter curve is as smooth as possible, the corresponding differential parameter is the optimal differential parameter.

In operation S203, in accordance with the temperature parameters at the first and second time instances, the rate of data transmission at the first time instance, and the corresponding thermal throttling parameter in the operating mode at the first time instance, an upper limit of the rate of data transmission at a third time instance is determined.

In some examples, as shown in FIG. 10, the third time instance t3 is separated from the first time instance t2 by a preset period $\Delta t$.

In some examples, the rate of data transmission V2 at the first time instance t2 may be the real-time rate of data transmission at the first time instance t2, or it may be the average rate of data transmission within a preset period (t1-t2 phase) before the first time instance t2.

In some examples, the upper limit of the rate of data transmission at the third time instance is determined in accordance with the following calculation formula:

$$V3\_limit = \tag{1}$$

$$V2 - \{P * (T2 - T1) + I * [(T2 + T1)/2 - Tsp] + D * [(T0 + T2)/2 - T1]\},$$

wherein, V3_limt is the upper limit of the rate of data transmission at the third time instance, V2 is the rate of data transmission at the first time instance, T0 is the temperature parameter at the second time instance t0 separated from the first time instance by two preset periods $2\Delta t$, T1 is the temperature parameter at the second time instance t1 separated from the first time instance by one preset period $\Delta t$, T2 is the temperature parameter at the first time instance t2, Tsp is the target control temperature, P is the proportion parameter, I is the integral parameter, and D is the differential parameter.

In some examples, when the differential parameter D in the corresponding thermal throttling parameter in the operating mode at the first time instance is 0, the differential parameter D which is equal to 0 is input into the calculation formula (1), i.e., V3_limt=V2−{P*(T2−T1)+I*[(T2+T1)/2−Tsp] may be obtained. It may be understood that when the differential parameter D in the corresponding thermal throttling parameter in the operating mode at the first time instance is 0, according to the temperature parameters at the first time instance t2 and a second time instance t1 before the first time instance, the rate of data transmission V2 at the first time instance t2, and the thermal throttling parameters at the first time instance, the upper limit of the rate of data transmission V3_limt at the third time instance may be determined.

After operation S203 is performed, operation S204 is performed, and the operation ends.

By performing the method for operating the memory system shown in FIG. 11, the finally obtained temperature parameter curve shown in FIG. 10 (the solid line curve shown in FIG. 10) which is stable is close to the target control temperature, and meanwhile, the fluctuation in the rate of data transmission curve of the memory system (the dotted curve shown in FIG. 10) gradually become smaller until the fluctuation is stable. Thus, in the process of effectively controlling the temperature of the memory system, the rate of data transmission of the memory system may be kept at a high level and relatively stable, thereby effectively improving the memory system performance and user experience.

Figure 12:
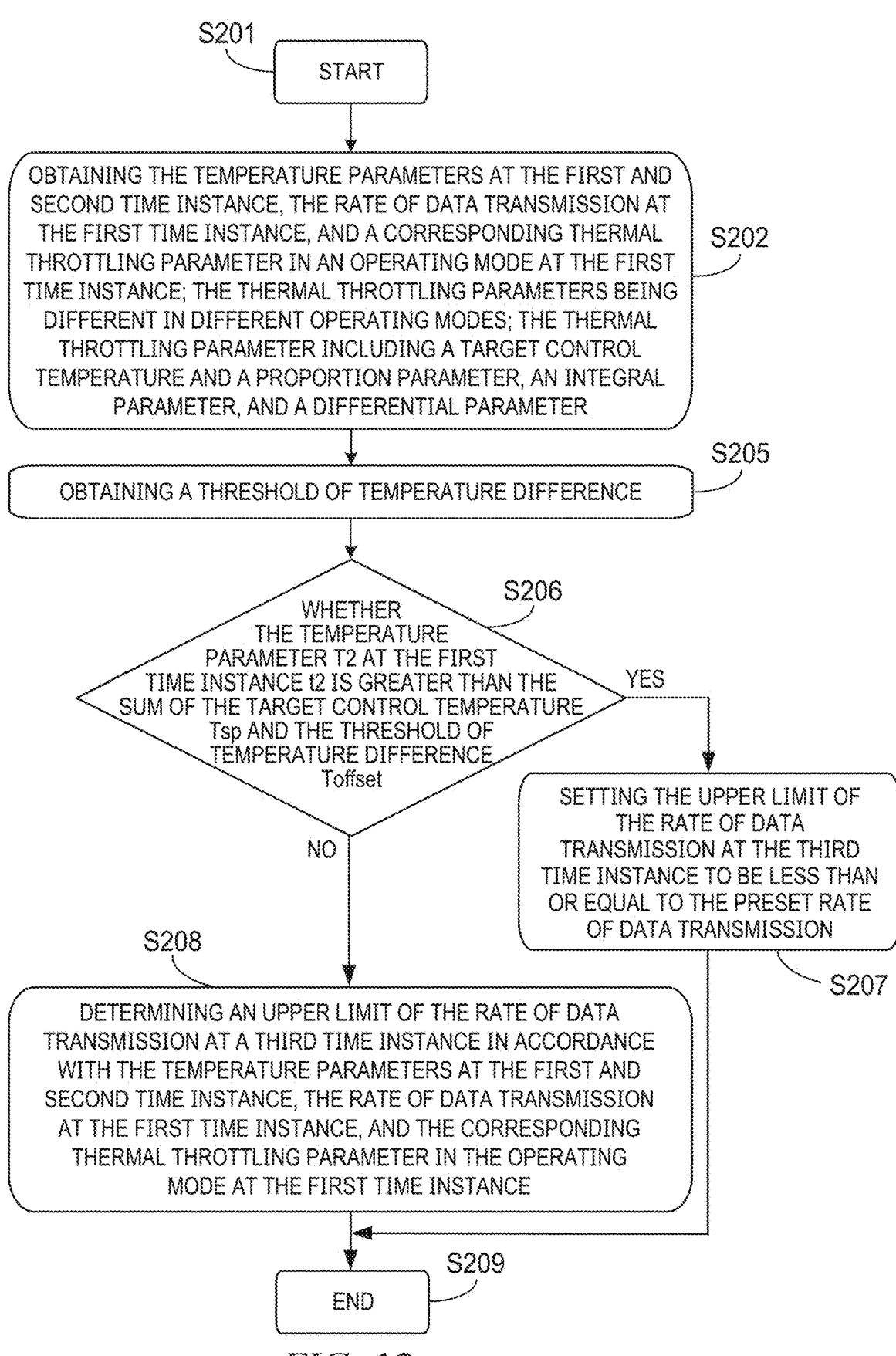
FIG. 12 is a flowchart of a method for operating a memory system provided by another example of the present application.

FIG. 12 is a flowchart of a method for operating a memory system provided by another example of the present application. The process of determining thermal throttling will be described in detail below with reference to FIGS. 10 and 12.

The operating method from operation S201 to operation S202 have been described before and will not be repeated here.

In operation S205, a threshold of temperature difference is obtained.

In operation S206, the temperature parameter T2 at the first time instance t2 is compared with the sum of the target control temperature Tsp and the threshold of temperature difference Toffset, and it is determined whether the temperature parameter T2 at the first time instance t2 is greater than the sum of the target control temperature Tsp and the threshold of temperature difference Toffset.

In some examples, the target control temperature Tsp is an upper limit of acceptable temperature when the memory system is operating. After reaching the target control temperature Tsp, a thermal throttling strategy may be used to reduce the temperature parameters of the memory system, and below the target control temperature Tsp, the memory system may still continue to operate normally. For example, the target control temperature Tsp is 70° C. or 75° C.

The threshold of temperature difference Toffset is an allowable temperature fluctuation range after the target control temperature Tsp is reached. When the temperature parameter of the memory system is less than or equal to the sum of the target control temperature Tsp and the threshold of temperature difference Toffset, the memory system may still continue to operate normally and no emergency measures may be triggered. The threshold of temperature difference Toffset may be an empirical value or a default value configured when the memory system leaves the factory. For example, the threshold of temperature difference Toffset may be 3° C., 4° C., or 5° C.

It should be noted that values of the target control temperature Tsp and the threshold of temperature difference Toffset are related to the type and purpose of the memory system, therefore, the target control temperature Tsp and the threshold of temperature difference Toffset of the memory system need to be set and optimized according to circumstances, to maintain the stability and reliability of the memory system in different usages and environmental conditions.

When the temperature parameter T2 at the first time instance t2 is greater than the sum of the target control temperature Tsp and the threshold of temperature difference Toffset, operation 207 is performed, the upper limit of the rate of data transmission at the third time instance is set to be less than or equal to the preset rate of data transmission. The preset rate of data transmission may be an empirical value or a default value configured when the memory system leaves the factory.

In some examples, the preset rate of data transmission is a rate of data transmission corresponding to 10% of full power consumption of the memory system. It may be understood that when the temperature parameter T2 at the first time instance t2 is greater than the sum of the target control temperature Tsp and the threshold of temperature difference Toffset, an emergency measure is taken to sharply reduce the upper limit of the rate of data transmission at the third time instance to the preset rate of data transmission, which may effectively prevent the memory system from being damaged due to high temperature and protect the integrity of the data.

In some examples, the preset rate of data transmission is 0MB/s, which is a more extreme emergency measure that may be executed in more urgent scenarios, e.g., executed when the temperature parameter T2 at the first time instance t2 is greater than the sum of the target control temperature Tsp and 2 times the threshold of temperature difference Toffset. This will cause the memory system to completely stop operating to ensure data security and prevent any potential damage to the memory system caused by high temperature. Once temperature parameter of the memory system is reduced to a safe range, the rate of data transmission of the memory system may be increased and normal operations may be resumed.

The operation S208 is performed when the temperature parameter T2 at the first time instance t2 is less than or equal to the sum of the target control temperature Tsp and the threshold of temperature difference Toffset, and an upper limit of the rate of data transmission at a third time instance is determined in accordance with the temperature parameters at the first and second time instance, the rate of data transmission at the first time instance, and the corresponding thermal throttling parameter in the operating mode at the first time instance.

In some examples, the upper limit of the rate of data transmission at the third time instance is determined in accordance with the following calculation formula:

$$V3\_limit = \tag{1}$$
$$V2 - \{P*(T2-T1)+I*[(T2+T1)/2-Tsp]+D*[(T0+T2)/2-T1]\},$$

wherein V3_limt is the upper limit of the rate of data transmission at the third time instance, V2 is the rate of data transmission at the first time instance, T0 is the temperature parameter at the second time instance t0 separated from the first time instance by two preset periods, T1 is the temperature parameter at the second time instance t1 separated from the first time instance by one preset period, T2 is the temperature parameter at the first time instance t2, Tsp is the target control temperature, P is the proportion parameter, I is the integral parameter, and D is the differential parameter.

In some examples, when the differential parameter D in the corresponding thermal throttling parameter in the operating mode at the first time instance is 0, the differential parameter D which is equal to 0 is input into the calculation formula (1), i.e., V3_limt=V2−{P*(T2−T1)+I*[(T2+T1)/2−Tsp] may be obtained. It may be understood that when the differential parameter D in the corresponding thermal throttling parameter in the operating mode at the first time instance is 0, according to the temperature parameters at the first time instance t2 and a second time instance t1 before the first time instance, the rate of data transmission V2 at the first time instance t2, and the thermal throttling parameters at the first time instance, the upper limit of the rate of data transmission V3_limt at the third time instance may be determined.

After operation S207 or operation S208 is performed, operation S209 is performed, and the operation ends.

The method for operating the memory system provided by the example of the present application determines the upper limit of the rate of data transmission at the third time instance after the first time instance by obtaining the rate of data transmission at the first time instance, the thermal throttling parameter at the first time instance, and the temperature parameter at a time instance that is at least one time instance before the first time instance. Thus, by dynamically predicting the upper limit of the rate of data transmission at the next time instance with temperature parameters and rate of data transmission in real time, the memory system may dynamically adjust the upper limit of the rate of data transmission at the next time instance. This intelligent thermal throttling strategy allows the memory system to flexibly adjust the rate of data transmission in real time in accordance with actual conditions, to protect the memory system from high temperature damage to the greatest extent while providing a good user experience. The balance between temperature parameters and performance of the memory system is implemented.

An example of the present application also provides a memory system. As shown in FIG. 1, the memory system 102 includes: a memory device 104; a memory controller 106 coupled to the memory device 104 and configured to perform the following operations shown in FIG. 9:

Operation S10: obtaining a temperature parameter at a first time instance and a temperature parameter at a second time instance, a rate of data transmission at the first time instance, and a thermal throttling parameter at the first time instance.

Operation 520: in accordance with the temperature parameters at the first and second time instances, the rate of data transmission at the first time instance, and the thermal throttling parameter at the first time instance, determining an upper limit of the rate of data transmission at a third time instance; wherein, the second time instance is at least one time instance before the first time instance, and the third time instance is a time instance after the first time instance.

In some examples, when only one temperature sensor is disposed inside the memory system, the temperature measured by the temperature sensor is the temperature parameter of the memory system.

In some examples, when a plurality of temperature sensors are disposed inside the memory system, obtaining the temperature parameters of the memory system includes: obtaining multiple temperature measurement data from temperature sensors at different locations included in the memory system, and obtaining the temperature parameters with the multiple temperature measurement data, and by a temperature composite algorithm. Thus, the temperature parameter may reflect the overall temperature of the memory system.

In some examples, the memory controller 106 is configured to: obtain the temperature parameters at the first and second time instances, the rate of data transmission at the first time instance, and a corresponding thermal throttling parameter in an operating mode at the first time instance; the thermal throttling parameters being different in different operating modes; the thermal throttling parameter including a target control temperature and a proportion parameter, an integral parameter, and a differential parameter.

In some examples, any two adjacent ones of the time instances are separated by a preset period. It should be understood that a temperature detection is required to be performed inside the memory system every preset period. The duration of the preset period ranges from 1 s to 5 s. In one example, the duration of the preset period may be 1 s, 3 s, or 5 s.

In some examples, as shown in FIG. 10, the temperature parameter T2 at the first time instance t2 and the second time instance, the temperature parameter T0 at the second time instance t0 separated from the first time instance t2 by two preset periods 2Δt, the temperature parameter T1 at the second time instance t1 separated from the first time instance t2 by one preset period Δt, the rate of data transmission V2 at the first time instance t2, and a corresponding thermal throttling parameter in an operating mode at the first time instance t2 are obtained; the thermal throttling parameters being different in different operating modes; the thermal throttling parameter including a target control temperature Tsp and a proportion parameter, an integral parameter, and a differential parameter.

In some examples, the memory controller 106 is configured to: determine the operating mode in which the memory system is at the first time instance; and obtain the corresponding thermal throttling parameter in the operating mode at the first time instance in accordance with the determined operating mode.

In some implementations, the memory controller 106 is further configured to: obtain the proportion parameter, integral parameter, and differential parameter which are optimal in the corresponding operating mode respectively for each of various operating modes of the memory system; generate a mapping table between the various operating modes and the corresponding optimal proportion parameters, integral parameters, and differential parameters, store the mapping table and trigger a call in the corresponding operating mode.

In some implementations, a large number of simulation experiments may be performed on the memory system before leaving the factory, the proportion parameter, integral parameter, and differential parameter which are optimal in the corresponding operating mode are obtained respectively for each of various operating modes of the memory system.

In one example, different workloads and data access modes, e.g., read-only, write-only, mixed read-write, etc., are simulated, and different operating modes are representative to simulate actual usage. At the beginning, the proportion parameter P is set to an initial value, usually an empirical value. At this point, the differential parameter D may be set to 0, and the integral parameter I may be set to 0. The fluctuation of the temperature parameter curve of the memory system in different operating modes is recorded, the proportion parameter P (the P value is generally adjusted from small to large) is gradually adjusted, and its impact on the temperature parameter curve of the memory system is observed. The temperature parameter curves for different proportion parameters P are analyzed, wherein the optimal proportion parameter P may cause the temperature parameter curve to change neither oscillate excessively nor lag.

After the optimal proportion parameters in different operating modes are determined, the optimal proportion parameter is used and the differential parameter D is set to 0, the fluctuation of the temperature parameter curve of the memory system in different operating modes is recorded, the integral parameter I (the I value is generally adjusted from large to small) is gradually adjusted, and it is confirmed that when the temperature oscillation period and amplitude in the temperature parameter curve are small, the corresponding integral parameter is the optimal integral parameter. Then, in accordance with the confirmed optimal proportion parameter and optimal integral parameter, the adjustment of the differential parameter D value is increased, and it is confirmed that fluctuation amplitude of the temperature parameter curve in a small range decreases or disappears, and when the temperature parameter curve is as smooth as possible, the corresponding differential parameter is the optimal differential parameter.

In some examples, the memory controller 106 is configured to: when the temperature parameter at the first time instance exceeds the target control temperature, control the rate of data transmission at the third time instance to be below the corresponding upper limit of the rate of data transmission, so that the temperature parameter is close to the target control temperature. In some examples, as shown in FIG. 10, when the temperature parameter T2 at the first time instance t2 exceeds the target control temperature Tsp, the rate of data transmission at the third time instance t3 is controlled to be below the corresponding upper limit of the rate of data transmission, so that the temperature parameter is close to the target control temperature Tsp.

In some examples, the memory controller 106 is configured to: in accordance with the temperature parameters at the first and second time instance, the rate of data transmission at the first time instance, and the corresponding thermal throttling parameter in the operating mode at the first time instance, determine an upper limit of the rate of data transmission at a third time instance.

In some examples, as shown in FIG. 10, the third time instance t3 is separated from the first time instance t2 by a preset period Δt.

In some examples, the rate of data transmission V2 at the first time instance t2 may be the real-time rate of data transmission at the first time instance t2, or the average rate of data transmission within a preset period (t1-t2 phase) before the first time instance t2.

In some examples, the upper limit of the rate of data transmission at the third time instance is determined in accordance with the following calculation formula:

$$V3\_limit =$$
$$V2 - \{P*(T2 - T1) + I*[(T2 + T1)/2 - Tsp] + D*[(T0 + T2)/2 - T1]\},$$

wherein V3_limt is the upper limit of the rate of data transmission at the third time instance, V2 is the rate of data transmission at the first time instance, T0 is the temperature parameter at the second time instance separated from the first time instance by two preset periods, T1 is the temperature parameter at the second time instance separated from the first time instance by one preset period, T2 is the temperature parameter at the first time instance, Tsp is the target control temperature, P is the proportion parameter, I is the integral parameter, and D is the differential parameter.

In some examples, the memory controller 106 is further configured to: obtain a threshold of temperature difference; and when the temperature parameter at the first time instance is greater than or equal to the sum of the target control temperature and the threshold of temperature difference, set the upper limit of the rate of data transmission at the third time instance to be less than or equal to the preset rate of data transmission.

In some examples, the target control temperature Tsp is an upper limit of acceptable temperature when the memory system is operating. After reaching the target control temperature Tsp, a thermal throttling strategy may be used to reduce the temperature parameters of the memory system, and when being below the target control temperature Tsp, the memory system may still continue to operate normally. For example, the target control temperature Tsp is 70° C. or 75° C.

The threshold of temperature difference Toffset is an allowable temperature fluctuation range after the target control temperature Tsp is reached. When the temperature parameter of the memory system is less than or equal to the sum of the target control temperature Tsp and the threshold of temperature difference Toffset, the memory system may still continue to operate normally and no emergency measures will be triggered. The threshold of temperature difference Toffset may be an empirical value or a default value configured when the memory system leaves the factory. For example, the threshold of temperature difference Toffset may be 3° C., 4° C., or 5° C.

It should be noted that values of the target control temperature Tsp and the threshold of temperature difference Toffset are related to the type and purpose of the memory system, therefore, the target control temperature Tsp and the threshold of temperature difference Toffset of the memory system need to be set and optimized according to circumstances, to maintain the stability and reliability of the memory system in different usages and environmental conditions.

When the temperature parameter T2 at the first time instance t2 is greater than the sum of the target control temperature Tsp and the threshold of temperature difference Toffset, the upper limit of the rate of data transmission at the third time instance is set to be less than or equal to the preset rate of data transmission. The preset rate of data transmission may be an empirical value or a default value configured when the memory system leaves the factory. In some examples, the preset rate of data transmission is a rate of data transmission corresponding to 10% of full power consumption of the memory system. It may be understood that when the temperature parameter T2 at the first time instance t2 is greater than the sum of the target control temperature Tsp and the threshold of temperature difference Toffset, emergency measures are taken to sharply reduce the upper limit of the rate of data transmission at the third time instance to the preset rate of data transmission, which may effectively prevent the memory system from being damaged due to high temperature and protect the integrity of the data.

In some examples, when the temperature parameter T2 at the first time instance t2 is less than or equal to the sum of the target control temperature Tsp and the threshold of temperature difference Toffset, an upper limit of the rate of data transmission at a third time instance is determined in accordance with the temperature parameters at the first and second time instance, the rate of data transmission at the first time instance, and the corresponding thermal throttling parameter in the operating mode at the first time instance.

In some examples, the upper limit of the rate of data transmission at the third time instance is determined in accordance with the following calculation formula:

$$V3\_limit =$$
$$V2 - \{P*(T2 - T1) + I*[(T2 + T1)/2 - Tsp] + D*[(T0 + T2)/2 - T1]\},$$

V3_limt is the upper limit of the rate of data transmission at the third time instance, V2 is the rate of data transmission at the first time instance, T0 is the temperature parameter at the second time instance separated from the first time instance by two preset periods, T1 is the temperature parameter at the second time instance separated from the first time instance by one preset period, T2 is the temperature parameter at the first time instance, Tsp is the target control temperature, P is the proportion parameter, I is the integral parameter, and D is the differential parameter.

An example of the present application also provides a memory system, including: a memory device; a memory controller coupled to the memory device and configured to: within a period after the temperature parameter of the memory system exceeds the target control temperature, in different operating environments, by adjusting the rate of data transmission of the memory system, cause the fluctuation of the rate of data transmission of the memory system to gradually become smaller until the fluctuation is stable (the dashed curve shown in FIG. 10), and the temperature parameter to be close to the target control temperature when the temperature parameter is stable (the solid curve shown in FIG. 10).

Figure 13:
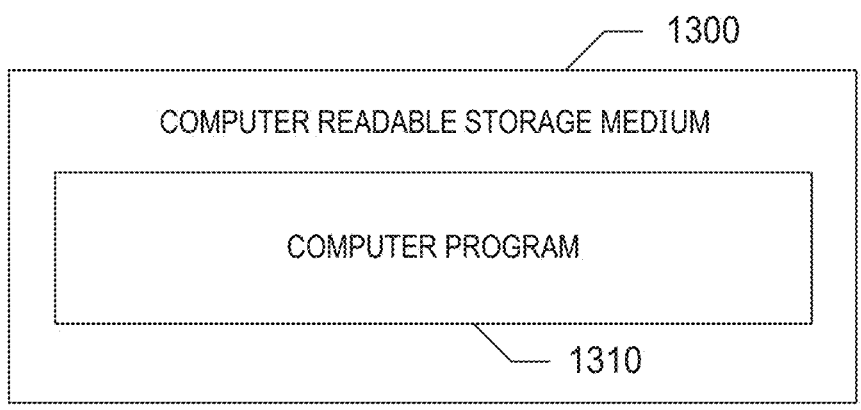
FIG. 13 is a block diagram of a computer readable storage medium provided by an example of the present application.

FIG. 13 is a block diagram of a computer readable storage medium provided by an example of the present application. As shown in FIG. 13, the computer readable storage medium 1300 stores computer program 1310 that when executed by a processor, may implement the method for operating a memory system of the technical schemes described above. The method includes: obtaining a temperature parameter at a first time instance and a temperature parameter at a second time instance, a rate of data transmission at the first time instance, and a thermal throttling parameter at the first time instance; in accordance with the temperature parameters at the first and second time instance, the rate of data transmission at the first time instance, and the thermal throttling parameter at the first time instance, determining an upper limit of the rate of data transmission at a third time instance; wherein, the second time instance is at least one time instance before the first time instance, and the third time instance is a time instance after the first time instance.

The methods disclosed in method examples provided in the present application may be combined arbitrarily without conflicts to obtain new method examples.

The features disclosed in several apparatus examples provided in the present application may be combined arbitrarily without conflicts to obtain new apparatus examples.

It should be understood that reference throughout the description to "one example" or "an example" means that a particular feature, structure or characteristic related to the example is included in at least one example of the present application. Thus, appearances of "in one example" or "in an example" in various places throughout the description are not necessarily referring to the same example. Furthermore, these particular features, structures or characteristics may be combined in any appropriate manner in one or more examples. It should be understood that in various examples of the present application, sequence numbers of the processes described above do not mean the execution order, and the execution order of each process should be determined by its function and internal logic, and should not constitute any limitation to implementation process of examples of the present application. The serial numbers of examples of the present application described above are for the purpose of description only, and do not represent the advantages and disadvantages of the examples.

The above is only a preferred example of the present application, and does not limit the patent scope of the present application, and under the inventive concept of the present application, any equivalent structural transformation made by using content of the present application and the accompanying drawings, or direct/indirect application in other related technical fields are included in the patent protection scope of the present application.

What is claimed is:

1. A memory system, including:

a memory device; and a memory controller coupled to the memory device and configured to:

obtain a temperature parameter at a first time instance, a temperature parameter at a second time instance, a rate of data transmission at the first time instance, and a thermal throttling parameter at the first time instance, wherein the thermal throttling parameter includes a target control temperature;

determine an upper limit of a rate of data transmission at a third time instance based on the temperature parameters at the first and second time instances, the rate of data transmission at the first time instance, and the thermal throttling parameter at the first time instance, wherein the second time instance is at least one time instance before the first time instance, and wherein the third time instance is a time instance after the first time instance; and in response to the temperature parameter at the first time instance exceeding the target control temperature, control the rate of data transmission at the third time instance to be below a corresponding upper limit of the rate of data transmission, so that the temperature parameter is close to the target control temperature.

2. The memory system of claim 1, wherein the memory controller is configured to:

obtain the temperature parameters at the first and second time instances, the rate of data transmission at the first time instance, and a corresponding thermal throttling parameter in an operating mode at the first time instance; wherein the thermal throttling parameters are different in different operating modes; and the thermal throttling parameter includes a proportion parameter, an integral parameter, and a differential parameter; and determine the upper limit of the rate of data transmission at the third time instance based on the temperature parameters at the first and second time instances, the rate of data transmission at the first time instance, and the corresponding thermal throttling parameter in the operating mode at the first time instance, wherein any two adjacent ones of time instances are separated by a preset period.

3. The memory system of claim 2, wherein the preset period comprises ranges from 1 s to 5 s.

4. The memory system of claim 2, wherein the memory controller is configured to:

determine the upper limit of the rate of data transmission at the third time instance based on the following calculation formula:

$$V3\_limit =$$
$$V2 - \{P*(T2-T1) + I*[(T2+T1)/2 - Tsp] + D*[(T0+T2)/2 - T1]\}$$

wherein V3_limt is the upper limit of the rate of data transmission at the third time instance, V2 is the rate of data transmission at the first time instance, T0 is a temperature parameter at a second time instance separated from the first time instance by two preset periods, T1 is a temperature parameter at a second time instance separated from the first time instance by one preset period, T2 is the temperature parameter at the first time instance, Tsp is the target control temperature, P is the proportion parameter, I is the integral parameter, and D is the differential parameter.

5. The memory system of claim 2, wherein the memory controller is further configured to:

obtain a threshold of temperature difference; and set the upper limit of the rate of data transmission at the third time instance to be less than or equal to a preset rate of data transmission, in response to the temperature parameter at the first time instance is greater than or equal to a sum of the target control temperature and the threshold of temperature difference.

6. The memory system of claim 5, wherein the preset rate of data transmission is a rate of data transmission corresponding to 10% of full power consumption of the memory system.

7. The memory system of claim 2, wherein the memory controller is configured to:

determine an operating mode in which the memory system is at the first time instance; and obtain a corresponding thermal throttling parameter in the operating mode at the first time instance based on the determined operating mode.

8. The memory system of claim 7, wherein the memory controller is further configured to:

for each of multiple operating modes of the memory system, obtain a proportion parameter, an integral parameter, and a differential parameter that are optimal in the corresponding operating mode respectively;

generate a mapping table between the multiple operating modes and corresponding optimal proportion parameters, integral parameters, and differential parameters;

store the mapping table; and trigger a call in the corresponding operating mode.

9. The memory system of claim 1, wherein the memory controller is configured to:

obtain multiple temperature measurement data from temperature sensors at different locations included in the memory system; and obtain the temperature parameters with the multiple temperature measurement data and by a temperature composite algorithm.

10. The memory system of claim 1, wherein the memory system comprises solid state drive (SSD).

11. The memory system of claim 1, wherein the memory device comprises a three-dimensional NAND memory.

12. A method of operating a memory system, including:

obtaining a temperature parameter at a first time instance, a temperature parameter at a second time instance, a rate of data transmission at the first time instance, and a thermal throttling parameter at the first time instance, wherein the thermal throttling parameter includes a target control temperature; and determining an upper limit of a rate of data transmission at a third time instance based on the temperature parameters at the first and second time instances, the rate of data transmission at the first time instance, and the thermal throttling parameter at the first time instance, wherein the second time instance is at least one time instance before the first time instance, and wherein the third time instance is a time instance after the first time instance; and in response to the temperature parameter at the first time instance exceeding the target control temperature, controlling the rate of data transmission at the third time instance to be below a corresponding upper limit of the rate of data transmission, so that the temperature parameter is close to the target control temperature.

13. The method of claim 12, further including:

obtaining the temperature parameters at the first and second time instances, the rate of data transmission at the first time instance, and a corresponding thermal throttling parameter in an operating mode at the first time instance; wherein the thermal throttling parameters are different in different operating modes; the thermal throttling parameter includes a proportion parameter, an integral parameter, and a differential parameter; and determining the upper limit of the rate of data transmission at the third time instance based on the temperature parameters at the first and second time instances, the rate of data transmission at the first time instance, and the corresponding thermal throttling parameter in the operating mode at the first time instance, wherein any two adjacent ones of time instances are separated by a preset period.

14. The method of claim 13, wherein the preset period comprises ranges from 1 s to 5 s.

15. The method of claim 13, further including:

determining the upper limit of the rate of data transmission at the third time instance based on the following calculation formula:

$$V3\_limit = $$

$$V2 - \{P*(T2 - T1) + I*[(T2 + T1)/2 - Tsp] + D*[(T0 + T2)/2 - T1]\}$$

wherein V3_limt is the upper limit of the rate of data transmission at the third time instance, V2 is the rate of data transmission at the first time instance, T0 is a temperature parameter at a second time instance separated from the first time instance by two preset periods, T1 is a temperature parameter at a second time instance separated from the first time instance by one preset period, T2 is the temperature parameter at the first time instance, Tsp is the target control temperature, P is the proportion parameter, I is the integral parameter, and D is the differential parameter.

16. The method of claim 13, further including:

obtaining a threshold of temperature difference; and setting the upper limit of the rate of data transmission at the third time instance to be less than or equal to a preset rate of data transmission, in response to the temperature parameter at the first time instance is greater than or equal to a sum of the target control temperature and the threshold of temperature difference.

17. The method of claim 13, further including:

determining an operating mode in which the memory system is at the first time instance; and obtaining the corresponding thermal throttling parameter in the operating mode at the first time instance based on the determined operating mode.

18. The method of claim 17, further including:

for each of multiple operating modes of the memory system, obtaining a proportion parameter, an integral parameter, and a differential parameter that are optimal in the corresponding operating mode respectively;

generating a mapping table between the multiple operating modes and corresponding optimal proportion parameters, integral parameters, and differential parameters;

storing the mapping table; and triggering a call in the corresponding operating mode.

19. A computer readable storage medium having a computer program stored thereon, that when executed by a processor, causes the processor to:

obtain a temperature parameter at a first time instance, a temperature parameter at a second time instance, a rate of data transmission at the first time instance, and a thermal throttling parameter at the first time instance, wherein the thermal throttling parameter includes a target control temperature; and determine an upper limit of a rate of data transmission at a third time instance based on the temperature parameters at the first and second time instances, the rate of data transmission at the first time instance, and the thermal throttling parameter at the first time instance, wherein the second time instance is at least one time instance before the first time instance, and wherein the third time instance is a time instance after the first time instance; and in response to the temperature parameter at the first time instance exceeding the target control temperature, controlling the rate of data transmission at the third time instance to be below a corresponding upper limit of the rate of data transmission, so that the temperature parameter is close to the target control temperature.

20. The computer readable storage medium of claim 19, wherein the computer program, when executed by the processor, causes the processor to:

obtain the temperature parameters at the first and second time instances, the rate of data transmission at the first time instance, and a corresponding thermal throttling parameter in an operating mode at the first time instance; wherein the thermal throttling parameters are different in different operating modes; and the thermal throttling parameter includes a proportion parameter, an integral parameter, and a differential parameter; and determine the upper limit of the rate of data transmission at the third time instance based on the temperature parameters at the first and second time instances, the rate of data transmission at the first time instance, and the corresponding thermal throttling parameter in the operating mode at the first time instance, wherein any two adjacent ones of time instances are separated by a preset period.

* * * * *